US008147376B2

(12) United States Patent
Takeshima et al.

(10) Patent No.: US 8,147,376 B2
(45) Date of Patent: Apr. 3, 2012

(54) CONSTRUCTION VEHICLE

(75) Inventors: Hiroaki Takeshima, Komatsu (JP); Masaaki Kuma, Hakusan (JP); Takashi Kuse, Komatsu (JP)

(73) Assignee: Komatsu Ltd., Tokyo (JP)

( * ) Notice: Subject to any disclaimer, the term of this patent is extended or adjusted under 35 U.S.C. 154(b) by 522 days.

(21) Appl. No.: 12/522,951

(22) PCT Filed: Jan. 31, 2008

(86) PCT No.: PCT/JP2008/051515
§ 371 (c)(1),
(2), (4) Date: Jul. 13, 2009

(87) PCT Pub. No.: WO2008/117567
PCT Pub. Date: Oct. 2, 2008

(65) Prior Publication Data
US 2010/0069198 A1 Mar. 18, 2010

(30) Foreign Application Priority Data

Mar. 28, 2007 (JP) ................................. 2007-083845

(51) Int. Cl.
*B60W 10/00* (2006.01)
*B60W 10/02* (2006.01)
*B60W 10/04* (2006.01)
(52) U.S. Cl. .............. 477/80; 477/79; 477/86; 477/174; 477/175
(58) Field of Classification Search .................... 477/79, 477/80, 86, 174, 175
See application file for complete search history.

(56) References Cited

U.S. PATENT DOCUMENTS

| 5,099,711 | A | | 3/1992 | Langbo et al. | |
| 5,370,016 | A | * | 12/1994 | Fujita et al. | 74/336 R |
| 6,679,134 | B2 | * | 1/2004 | Shigyo | 74/336 R |
| 6,949,051 | B2 | * | 9/2005 | Katakura | 477/175 |
| 7,314,427 | B2 | | 1/2008 | Sakai et al. | |
| 7,912,614 | B2 | * | 3/2011 | Honma et al. | 701/51 |

FOREIGN PATENT DOCUMENTS

| JP | 05-157159 A | 6/1993 |
| JP | 2004-161135 A | 6/2004 |
| JP | 2006-029476 A | 2/2006 |
| JP | 2006-194405 A | 7/2006 |

* cited by examiner

*Primary Examiner* — Tisha Lewis
(74) *Attorney, Agent, or Firm* — Global IP Counselors

(57) ABSTRACT

A construction vehicle includes a control unit configured to shift gear after performing pre-shifting to couple a target speed-change gear that corresponds to a target speed with a target speed-change shaft in non-transmitting state of rotation of the input shaft when the gear shift is performed from a current speed to the target speed, in a state in which the current speed gear that corresponds to the current speed step and the current speed-change shaft that corresponds to the current speed gear are coupled. When the vehicle speed detected by the vehicle speed detecting section is zero, the control unit is configured to perform pre-shift auxiliary control prior to the pre-shifting control to input the rotation of the input shaft to the target speed-change shaft in a state in which the target speed-change shaft is not coupled to the plurality of speed-change gears.

2 Claims, 23 Drawing Sheets

CONSTRUCTION VEHICLE

CROSS-REFERENCE TO RELATED APPLICATIONS

This national phase application claims priority to Japanese Patent Application No. 2007-083845, filed on Mar. 28, 2007. The entire disclosure of Japanese Patent Application No. 2007-083845 is hereby incorporated herein by reference.

TECHNICAL FIELD

The present invention relates to a construction vehicle.

BACKGROUND ART

A twin-clutch transmission speed change control device such as the one disclosed in Japanese Laid-Open Patent Publication No. 2006-194405 has been proposed in the past as a speed change control device of a transmission for a vehicle. In this type of speed change control device, pre-shifting is performed prior to switching from the current speed step that belongs to one speed step group to a target speed step that belongs to another speed step group. The term "pre-shifting" refers to an operation whereby a speed-change shaft that is not coupled to an input shaft among two speed-change shafts, and a target speed-change step gear that corresponds to a target speed-change step, are coupled using a coupling mechanism prior to switching of the speed-change step, allowing the time lag that occurs during switching of the speed-change step to be reduced. When, for example, the speed-change step is switched from a second speed to a third speed, one speed-change shaft is coupled with the input shaft and the speed-change step gear of the second speed, and the vehicle travels at the second speed. During this process, the coupling mechanism moves from the neutral position toward the speed-change step gear of the third speed, and a gear provided to the coupling mechanism meshes with a coupling gear provided to the speed-change step, whereby the other speed-change shaft that is not coupled with the input shaft is coupled with the speed-change step gear of the third speed. The speed-change shaft coupled with the speed-change step gear of the second speed is then released from the input shaft, and the speed-change shaft coupled with the speed-change step gear of the third speed is coupled with the input shaft, whereby the speed step is switched from the second speed to the third speed.

SUMMARY OF THE INVENTION

In a wheel loader or other construction vehicle, the speed-change step is sometimes switched when the vehicle is stopped, such as when the vehicle is stopped when traveling forward toward earth and sand. In this case, there is a risk that the speed-change shaft and the speed-change step gear will not be rapidly coupled in pre-shifting such as described above. Specifically, since the speed-change shaft involved in pre-shifting is not coupled with the input shaft, rotation is not transmitted from the input shaft, and the speed-change shaft is not rotating. Since the output shaft is not rotating when the vehicle is stopped, the speed-change step gear involved in pre-shifting also is not rotating. The relative speed of the speed-change shaft and the speed-change step gear is thus zero, in which case the teeth of the gear G1 on the side of the coupling mechanism and the teeth of the coupling gear G2 on the side of the speed-change step gear are in contact with each other as shown in FIG. 23. When this occurs, the teeth of the gears do not change position. Therefore, the gear G1 of the coupling mechanism and the gear G2 of the speed-change step gear do not mesh, and the coupling mechanism is kept immobile. This can delay switching of the speed-change step. FIG. 23 is a view showing a portion of the teeth of the gear G1 of the coupling mechanism and the coupling gear G2 of the speed-change step gears as viewed from the axial direction.

An object of the present invention is to provide a construction vehicle in which a speed-change step can be rapidly switched even when the vehicle is stopped.

A construction vehicle according to a first aspect of the present invention includes an input shaft, a first speed-change shaft and a second speed-change shaft, an output shaft, a clutch mechanism, a first transmission mechanism, a second transmission mechanism, a first coupling mechanism, a second coupling mechanism, a vehicle speed detecting section, and a control unit. The input shaft is a shaft to which rotation from an engine is inputted. The first speed-change shaft and the second speed-change shaft are shafts to which rotation from the input shaft is inputted. The output shaft is a shaft to which rotation from the first speed-change shaft and the second speed-change shaft is inputted. The clutch mechanism is configured and arranged to switch between a transmitting state and a non-transmitting state of rotation from the input shaft to the first speed-change shaft, and to switch between a transmitting state and a non-transmitting state of rotation from the input shaft to the second speed-change shaft. The first transmission mechanism is configured and arranged to shift rotational speed of the first speed-change shaft between a plurality of speeds that belongs to a first group of speeds, and to transmit the rotation to the output shaft. The first transmission mechanism has a plurality of speed-change gears that corresponds to the plurality of speeds belonging to the first group. The second transmission mechanism is configured and arranged to shift rotational speed of the second speed-change shaft between a plurality of speeds that belongs to a second group of speeds, and to transmit the rotation to the output shaft. The second transmission mechanism has a plurality of speed-change gears that corresponds to the plurality of speeds belonging to the second group. The first coupling mechanism is configured and arranged to switch between a coupling state and a non-coupling state between the first speed-change shaft and a selected one of the speed-change gears of the first transmission mechanism by selectively engaging with a clutch gear provided to the selected one of the speed-change step gears of the first transmission mechanism. The second coupling mechanism is configured and arranged to switch between a coupling state and a non-coupling state between the second speed-change shaft and a selected one of the speed-change gears of the second transmission mechanism by selectively engaging with a clutch gear provided to the selected one of the speed-change step gears of the second transmission mechanism. The vehicle speed detecting section is configured and arranged to detect the vehicle speed. The control unit is configured to control the clutch mechanism, the first and second transmission mechanism, and the first and second coupling mechanisms to shift gears from a current speed of one of the first and second groups to a target speed of the other of the first and second groups by performing a pre-shifting control to couple a target speed-change gear corresponding to the target speed with a target speed-change shaft, which is one of the first speed-change shaft and the second speed-change shaft in the non-transmitting state of rotation from the input shaft, in a state in which coupling is established between a current speed-change gear corresponding to the current speed and a current speed-change shaft, which is the other of the first and second speed-change shafts in the transmitting state of rotation from the input shaft, and then disabling transmission of rotation between the current speed-change shaft and the input shaft and enabling transmission of rotation between the target speed-change shaft and the input shaft. The control unit is configured to perform pre-shift auxiliary control prior to the pre-shifting control to input the rotation of the input shaft to the target speed-change shaft in a state in which the target speed-change shaft is not coupled to the plurality of speed-change gears, when the vehicle speed detected by the vehicle speed detector is zero.

In this construction vehicle, when the vehicle speed is zero, rotation from the input shaft is inputted to the target speed-change shaft before the pre-shifting. When rotation from the input shaft is inputted to the target speed-change shaft, even in a state in which the teeth of the gears for coupling the target speed-change shaft with the speed-change gears are in contact with each other and not meshed when pre-shifting is performed, the coupling mechanism and the clutch gear of the target speed-change gears shift position relative to each other, and the gears are able to mesh. Pre-shifting can thereby be performed in this construction vehicle even when the vehicle is stopped, and the gear shift can be rapidly performed.

The construction vehicle according to a second aspect of the present invention is the construction vehicle of the first aspect, further including a main clutch configured and arranged to switch between a transmitting state and a non-transmitting state of rotation from the engine to the input shaft. The clutch mechanism has a first clutch configured and arranged to switch between the transmitting state and the non-transmitting state of rotation from the input shaft to the first speed-change shaft, and a second clutch configured and arranged to switch between the transmitting state and the non-transmitting state of rotation from the input shaft to the second speed-change shaft. The control unit is configured to reduce transmission torque capacity of one of the first and second clutches for switching between the transmitting state and the non-transmitting state of rotation from the input shaft to the current speed-change shaft when an input speed from the main clutch to the input shaft reaches zero in the pre-shift auxiliary control. The control unit is further configured to increase transmission torque capacity of the other of the first and second clutches for switching between the transmitting state and the non-transmitting state of rotation from the input shaft to the target speed-change shaft when the input speed from the main clutch to the input shaft increases.

In this construction vehicle, when the vehicle speed reaches zero, the output shaft is then unable to rotate, and the load from the output shaft is transmitted to the input shaft via the transmission mechanism, the first coupling mechanism or second coupling mechanism, the current speed-change shaft, and the first clutch or second clutch. The input speed from the main clutch to the input shaft thereby reaches zero. In this case, the control unit reduces the transmission torque capacity of the clutch that switches between transmission and non-transmission of rotation from the input shaft to the current speed-change shaft. The load transmitted from the output shaft to the input shaft is thereby reduced, and the input speed from the main clutch to the input shaft increases. The increase in the input speed from the main clutch to the input shaft causes the control unit to increase the transmission torque capacity of the clutch that switches between transmission and non-transmission of rotation from the input shaft to the target speed-change shaft. The rotation of the input shaft is thereby inputted to the target speed-change shaft. In the construction vehicle described above, the input shaft can be rotated even when the vehicle is stopped, and the rotation of the input shaft can be inputted to the target speed-change shaft.

DETAILED DESCRIPTION OF THE PREFERRED EMBODIMENTS OVERALL STRUCTURE

Figure 1:
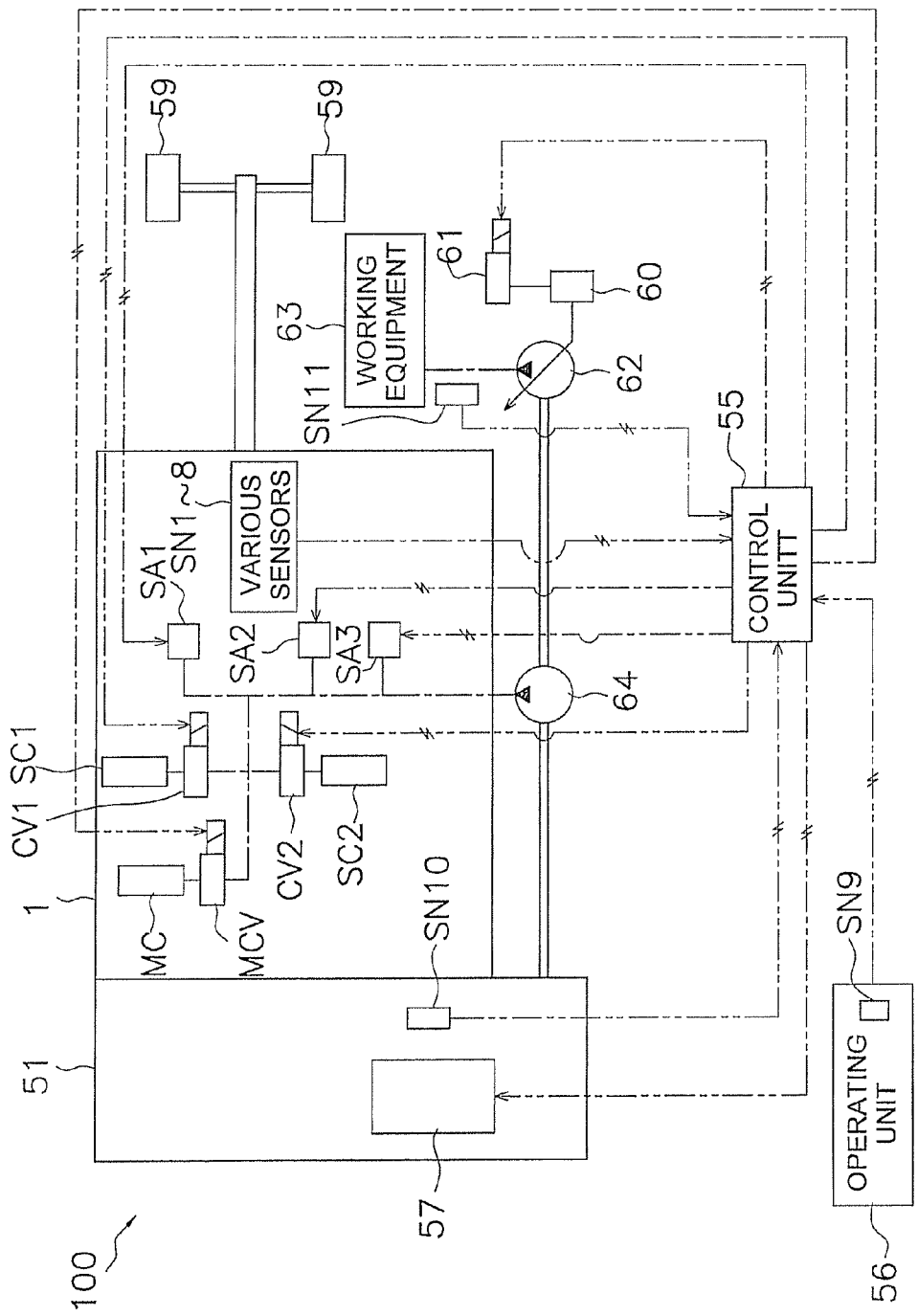
FIG. 1 is a block diagram showing the overall structure of the construction vehicle.

FIG. 1 is a block diagram showing the overall structure of the construction vehicle 100 according to an embodiment of the present invention. The construction vehicle 100 is a wheel loader, for example, and is provided with an engine 51, a transmission 1, an implement hydraulic pump 62, a working equipment 63, a control hydraulic pump 64, a control unit 55, an operating unit 56, various sensors SN1 through 11, and other components. The output torque generated by the engine 51 is distributed to the transmission 1, the implement hydraulic pump 62, the control hydraulic pump 64, and other components, and serves as the driving force during travel or driving of the working equipment 63.

The engine 51 is a diesel-type engine 51, and is equipped with a fuel injection device 57 for controlling the output torque and speed of the engine 51. The transmission 1 is coupled to the output shaft of the engine 51, and the driving force of the engine 51 is transmitted to tires 59 via the transmission 1. The speed reduction ratio of the transmission 1 can be switched to a plurality of levels from high speed to low speed, and the speed reduction ratio is switched based on a control signal from the control unit 55 described hereinafter. The transmission 1 will be described in detail hereinafter.

The implement hydraulic pump 62 is a variable-capacity hydraulic pump driven by the output of the engine 51, and the implement hydraulic pump 62 is provided with a regulator 60 for adjusting the tilting angle of the swash plate of the implement hydraulic pump 62 using pressurized oil discharged from the implement hydraulic pump 62, and an electromagnetic control valve 61 for controlling the regulator 60 on the basis of a control signal from the control unit 55.

The working equipment 63 has a lift arm, a bucket, implement cylinders for driving these components, and other components not shown in the drawing, and is driven by pressurized oil discharged from the implement hydraulic pump 62.

The control hydraulic pump 64 is a hydraulic pump driven by the output of the engine 51, and generates hydraulic pressure for operating the various clutches (main clutch MC, first snap clutch SC1, second snap clutch SC2) of the transmission 1 described hereinafter, a first shift actuator SA1, a second shift actuator SA2, and a third shift actuator SA3. A main clutch control valve MCV, a first clutch control valve CV1, and a second clutch control valve CV2 are provided to a hydraulic circuit that connects the control hydraulic pump 64 and the various clutches. The main clutch control valve MCV is electrically controlled by the control unit 55, and the hydraulic pressure fed to the main clutch MC can thereby be adjusted. The first clutch control valve CV1 is electrically controlled by the control unit 55, and the hydraulic pressure fed to the first snap clutch SC1 can thereby be adjusted. The second clutch control valve CV2 is electrically controlled by the control unit 55, and the hydraulic pressure fed to the second snap clutch SC2 can thereby be adjusted.

The control unit 55 controls the various devices described above on the basis of detection signals from the various sensors SN1 through 11, operation command signals from the operating unit 56 disposed in a cabin not shown in the drawing, and other signals. The control unit 55 will be described in detail hereinafter.

Structure of the Transmission 1

Figure 2:
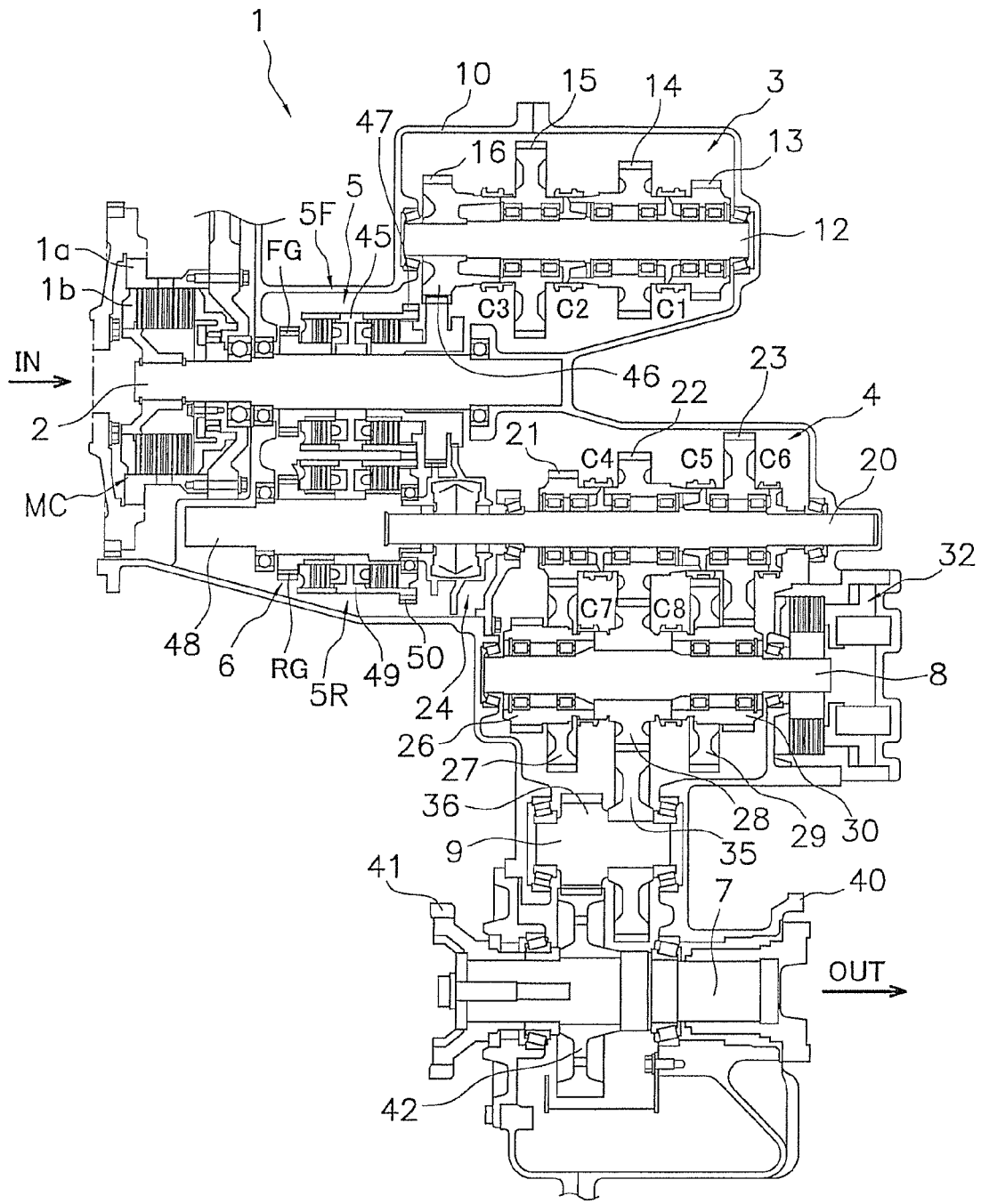
FIG. 2 is a developed sectional structure view showing the transmission.
Figure 3:
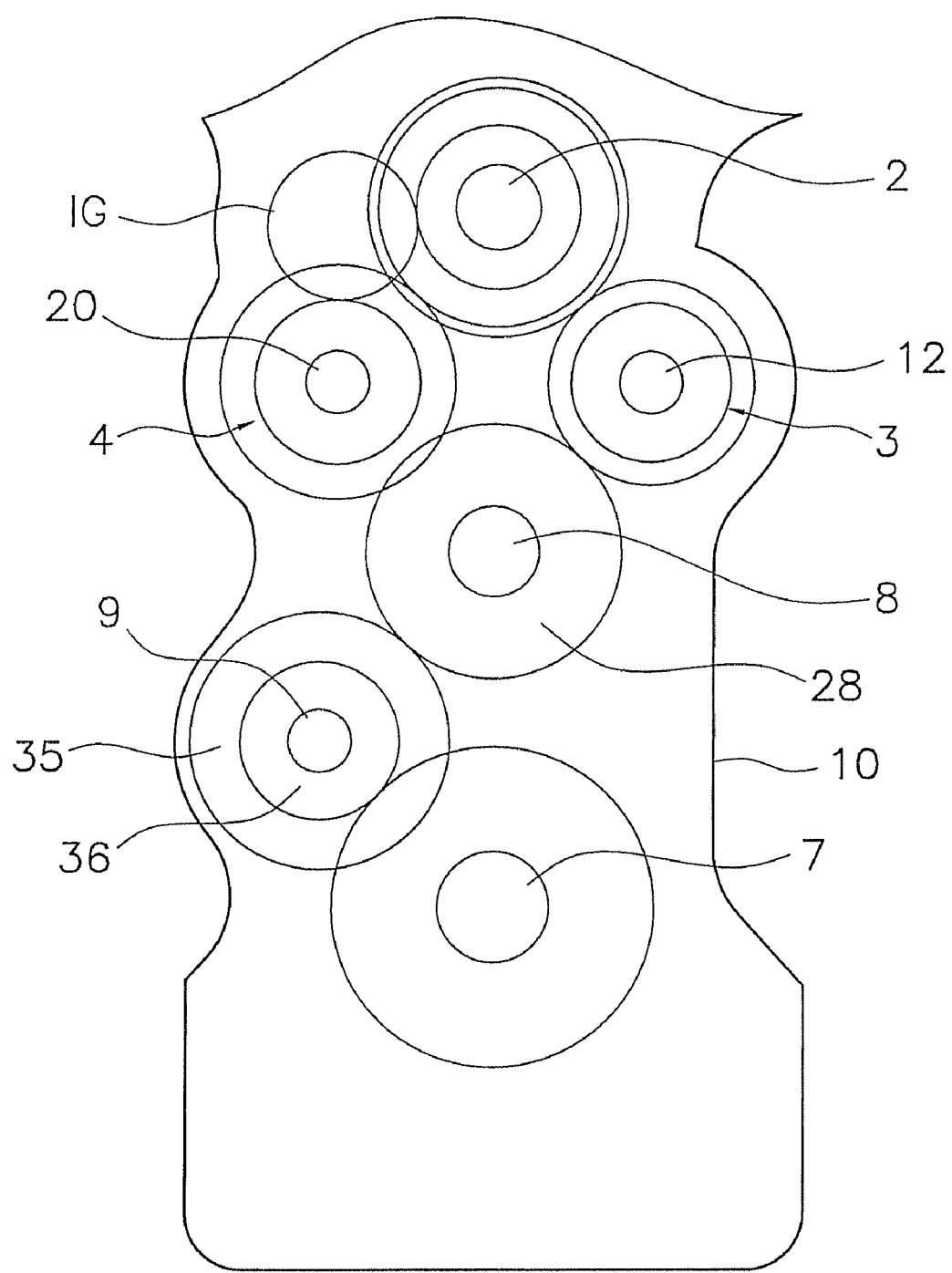
FIG. 3 is a view showing the transmission from the rear.
Figure 4:
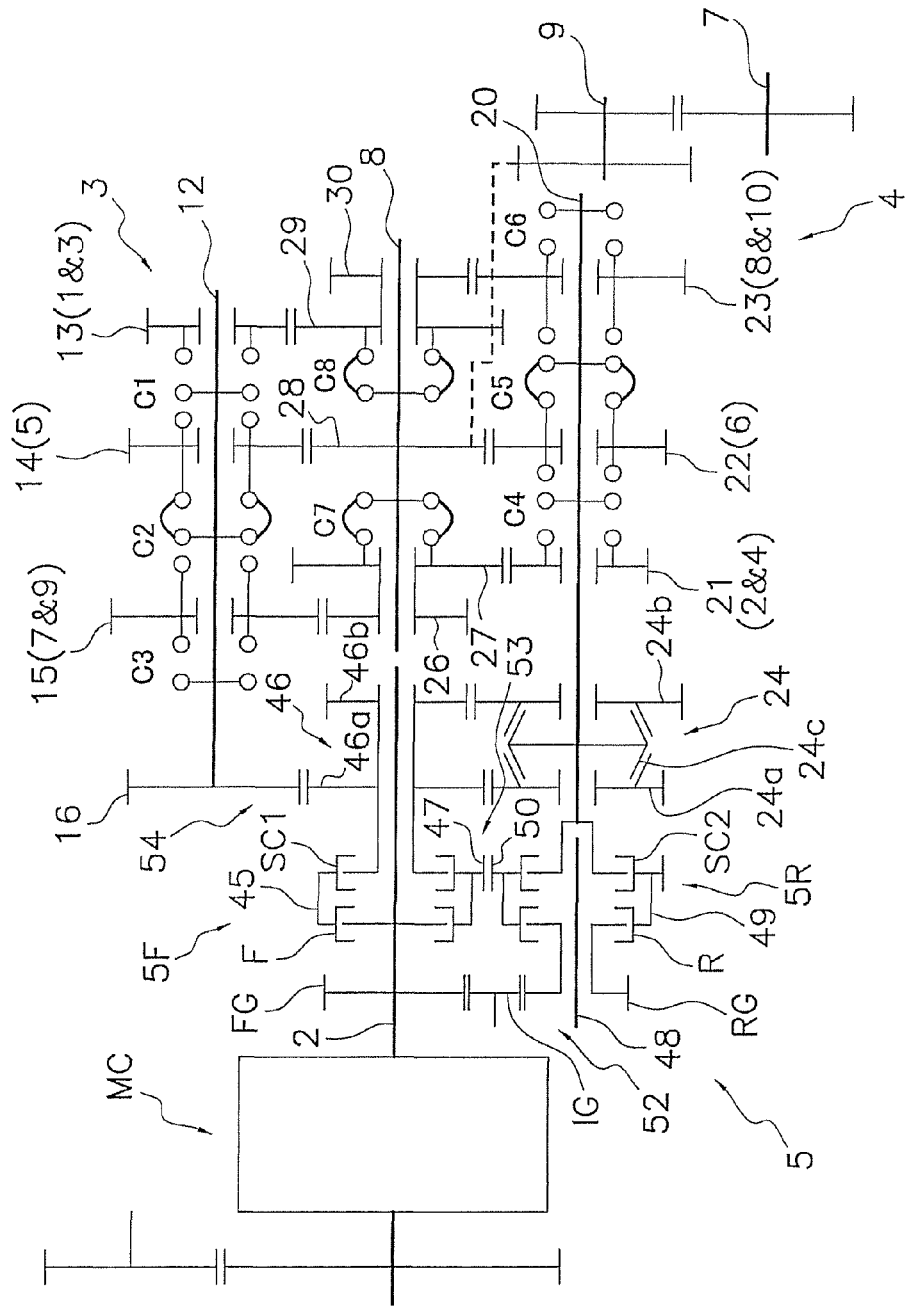
FIG. 4 is a skeleton view of the transmission.

FIG. 3 shows a simplified view of the arrangement of shafts and other components as viewed from the rear in the developed sectional structure of the transmission 1 in FIG. 2. FIG. 4 shows the skeleton of the transmission 1.

The transmission 1 shown in FIG. 2 has ten speed-change steps (ten speeds) as well as forward and reverse. The transmission 1 is provided with the main clutch MC to which rotation from the engine 51 is inputted; an input shaft 2 to which rotation from the engine 51 is inputted via the main clutch MC; a first speed-change shaft 12; a first transmission mechanism 3; first through third coupling sleeves C1 through C3; a second speed-change shaft 20; a second transmission mechanism 4; fourth through sixth coupling sleeves C4, C5, C6; a clutch mechanism 5; a rotation direction switching mechanism 6; and an output shaft 7. A speed change idle shaft 8 and an output idle shaft 9 are provided between the output shaft 7 and the first and second transmission mechanisms 3, 4.

Main Clutch MC

The main clutch MC is a hydraulic clutch, and the transmission torque capacity can be controlled by controlling the oil pressure fed via the main clutch control valve MCV (see FIG. 1). An input-side member 1a of the main clutch MC is coupled to a member on the side of the engine 51, and an output-side member 1b is coupled to the input shaft 2. The main clutch MC is thereby capable of switching between transmission and non-transmission of rotation from the engine 51 to the input shaft 2. A power takeoff mechanism (not shown) for driving auxiliary devices is coupled to the input-side member 1a of the main clutch MC.

Input Shaft 2

The input shaft 2 is supported by a pair of bearings so as to be able to rotate with respect to a housing 10 of the transmission 1. The output-side member 1b of the main clutch MC is spline-connected to the distal end of the input shaft 2, and the input-side member 1a of the main clutch MC is rotatably supported via a bearing.

First Speed-Change Shaft 12 and First Transmission Mechanism 3

The first speed-change shaft 12 is decentered with respect to the input shaft 2 and arranged parallel to the input shaft 2, and is supported by a pair of bearings so as to be able to rotate with respect to the housing 10.

The first transmission mechanism 3 has a plurality of speed-change step gears (speed-change gears) that corresponds to a plurality of speed-change steps belonging to a first group of speed-change steps, and the first transmission mechanism 3 is a mechanism for shifting the rotation of the first speed-change shaft 12 between the plurality of speed-change steps belonging to the first group of speed-change steps, and transmitting the rotation to the output shaft 7. Specifically, the first group of speed-change steps is the group of odd-numbered steps (1st and 3rd, 5th, and 7th and 9th speeds) among the ten speed-change steps. The plurality of speed-change step gears corresponding to the plurality of speed-change steps that belongs to the first group of speed-change steps includes a first-and third-speed (1st-and 3rd-speed hereinafter) drive gear 13, a fifth-speed (5th-speed hereinafter) drive gear 14, a seventh-and ninth-speed (7th-and 9th-speed hereinafter) drive gear 15, and a speed reduction gear 16. Consequently, rotation is inputted to the first transmission mechanism 3 when an odd-numbered speed-change step has been selected. The 1st-and 3rd-speed drive gear 13, the 5th-speed drive gear 14, and the 7th-and 9th-speed drive gear 15 are each rotatably supported at the first speed-change shaft 12 by a pair of bearings. A clutch gear capable of engaging with first through third coupling sleeves C1 through C3 is provided to the external peripheral surface of the end parts in the axial direction of each of the 1st-and 3rd-speed drive gear 13, the 5th-speed drive gear 14, and the 7th-and 9th-speed drive gear 15. The speed reduction gear 16 is mounted to the distal end part on the engine 51 side of the first speed-change shaft 12 so as to be incapable of relative rotation.

First Through Third Coupling Sleeves C1 Through C3

Figure 5:
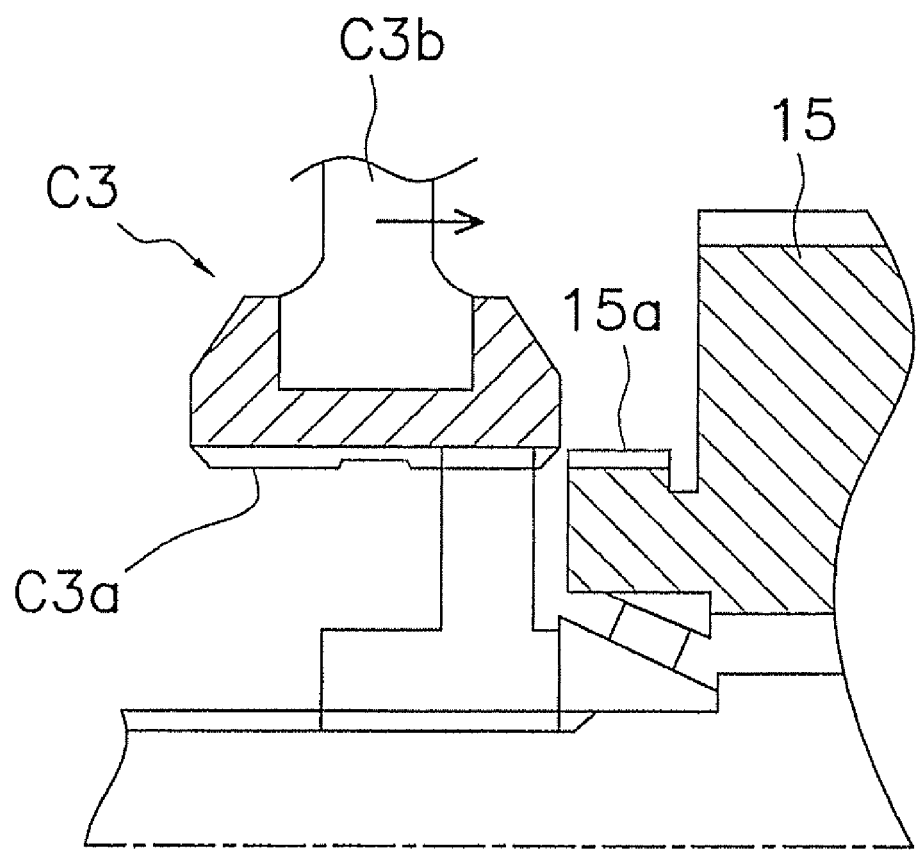
FIG. 5 is a simplified view showing the structure of the coupling sleeve and the drive gear.

The first through third coupling sleeves C1 through C3 are clutches for moving in the axial direction and coupling two drive gears to each other, or fixing the drive gears 13 through 15 to the first speed-change shaft 12 so as to be incapable of relative rotation. The first through third coupling sleeves C1 through C3 are attached so as to be able to move in the axial direction, and the first through third coupling sleeves C1 through C3 rotate together with the first speed-change shaft 12. The first through third coupling sleeves C1 through C3 have a sleeve gear on the internal peripheral surfaces thereof that is capable of engaging with the clutch gears of the 1st-and 3rd-speed drive gear 13, 5th-speed drive gear 14, and 7th-and 9th-speed drive gear 15, and the first through third coupling sleeves C1 through C3 correspond to the first coupling mechanism for switching between the coupling and non-coupling of the first speed-change shaft 12 and the drive gears 13 through 15 by engagement/disengagement with the clutch gears provided to the drive gears 13 through 15 of the first transmission mechanism 3. For example, as shown in FIG. 5, a clutch gear 15a is provided to the external peripheral surface of the end part in the axial direction of the 7th-and 9th-speed drive gear 15, and a sleeve gear C3a capable of engaging with the clutch gear 15a is provided to the third coupling sleeve C3.

Specifically, the first coupling sleeve C1 activates coupling (coupled) between the first speed-change shaft 12 and the 1st-and 3rd-speed drive gear 13, activates coupling between the 1st-and 3rd-speed drive gear 13 and the 5th-speed drive gear 14, or deactivates coupling (no coupling). The second coupling sleeve C2 activates coupling between the first speed-change shaft 12 and the 5th-speed drive gear 14, activates coupling between the 5th-speed drive gear 14 and the 7th-and 9th-speed drive gear 15, or deactivates coupling. The third coupling sleeve C3 activates or deactivates coupling between the first speed-change shaft 12 and the 7th-and 9th-speed drive gear 15.

The first through third coupling sleeves C1 through C3 are moved by a first shift actuator SA1 (see FIG. 1). For example, as shown in FIG. 5, a shift fork C3b moved by the first shift actuator SA1 is provided to the third coupling sleeve C3, and the third coupling sleeve C3 is moved in the axial direction of the first speed-change shaft 12 by the movement of the shift fork C3b. The first and second coupling sleeves C1, C2 both have the same structure as the third coupling sleeve C3.

Second Speed-Change Shaft 20 and Second Transmission Mechanism 4

The second speed-change shaft 20 is decentered with respect to the input shaft 2 and arranged parallel to the input shaft 2 and the first speed-change shaft 12, and is supported by a pair of bearings so as to be able to rotate with respect to the housing 10.

The second transmission mechanism 4 has a plurality of speed-change step gears that corresponds to a plurality of speed-change steps belonging to a second group of speed-change steps, and the second transmission mechanism 4 is a mechanism for shifting the rotation of the second speed-change shaft 20 between the plurality of speed-change steps belonging to the second group of speed-change steps, and transmitting the rotation to the output shaft 7. Specifically, the second group of speed-change steps is the group of even-numbered steps (2nd and 4th, 6th, and 8th and 10th speeds) among the ten speed-change steps. The plurality of speed-change step gears corresponding to the plurality of speed-change steps that belongs to the second group of speed-change steps includes a second and fourth-speed (2nd and 4th-speed hereinafter) drive gear 21, a sixth speed (6th speed hereinafter) drive gear 22, and an eighth-and tenth-speed (8th-and 10th-speed hereinafter) drive gear 23. Consequently, rotation is inputted to the second transmission mechanism 4 when an even-numbered speed-change step has been selected. The 2nd and 4th-speed drive gear 21, the 6th-speed drive gear 22, and the 8th-and 10th-speed drive gear 23 are each rotatably supported at the second speed-change shaft 20 by a pair of bearings. A clutch gear capable of engaging with fourth through sixth coupling sleeves C4, C5, C6 is provided to the external peripheral surface of the end parts in the axial direction of each of the 2nd and 4th-speed drive gear 21, the 6th-speed drive gear 22, and the 8th-and 10th-speed drive gear 23.

Fourth Through Sixth Coupling Sleeves C4 Through C6

The fourth through sixth coupling sleeves C4, C5, C6 are clutches for moving in the axial direction and coupling two drive gears to each other or fixing the drive gears 21 through 23 to the second speed-change shaft 20 (so as to be incapable of relative rotation). The fourth through sixth coupling sleeves C4 through C6 are mounted so as to be able to move in the axial direction, and the fourth through sixth coupling sleeves C4 through C6 rotate together with the second speed-change shaft 20. The fourth through sixth coupling sleeves C4 through C6 have a sleeve gear on the internal peripheral surfaces thereof that is capable of engaging with the clutch gears of the 2nd and 4th-speed drive gear 21, 6th-speed drive gear 22, and 8th-and 10th-speed drive gear 23, and the fourth through sixth coupling sleeves C4 through C6 correspond to the second coupling mechanism for switching between the coupling and non-coupling of the second speed-change shaft 20 and the drive gears 21 through 23 by engagement/disengagement with the clutch gears provided to the drive gears 21 through 23 of the second transmission mechanism 4.

Specifically, the fourth coupling sleeve C4 activates coupling between the second speed-change shaft 20 and the 2nd and 4th-speed drive gear 21, activates coupling between the 2nd and 4th-speed drive gear 21 and the 6th-speed drive gear 22, or deactivates coupling. The fifth coupling sleeve C5 activates coupling between the second speed-change shaft 20 and the 6th-speed drive gear 22, activates coupling between the 6th-speed drive gear 22 and the 8th-and 10th-speed drive gear 23, or deactivates coupling. The sixth coupling sleeve C6 activates or deactivates coupling between the second speed-change shaft 20 and the 8th-and 10th-speed drive gear 23.

The fourth through sixth coupling sleeves C4 through C6 are moved by a second shift actuator SA2 (see FIG. 1).

The second speed-change shaft 20 is also provided with a synchro mechanism 24 for causing the coupling sleeves to mesh smoothly during speed changing. As shown in FIG. 4, the synchro mechanism 24 has a first synchro gear 24a and a second synchro gear 24b that are each supported so as to be able to rotate relative to the second speed-change shaft 20, and the synchro mechanism 24 also has a cone clutch 24c for coupling the synchro gears 24a, 24b with the second speed-change shaft 20.

Speed Change Idle Shaft 8

The speed change idle shaft 8 is supported by a pair of bearings so as to be able to rotate with respect to the housing 10, in the same manner as the speed-change shafts 12, 20. As shown in FIG. 3, the speed change idle shaft 8 is disposed below and parallel to the first and second speed-change shafts 12, 20, and on the same vertical line as the input shaft 2. The speed change idle shaft 8 is provided with driven gears for meshing with the drive gears provided to the first and second transmission mechanisms 3, 4, and is provided with seventh and eighth coupling sleeves C7, C8. More specifically, first through fifth driven gears 26, 27, 28, 29, 30 in sequence from the engine 51 side are each rotatably supported by the speed change idle shaft 8 via bearings. The first driven gear 26 and the second driven gear 27 are configured so as to rotate integrally with each other, and the fourth driven gear 29 and the fifth driven gear 30 are configured so as to rotate integrally with each other. The first driven gear 26 is always meshed with the 7th-and 9th-speed drive gear 15, the second driven gear 27 is always meshed with the 2nd and 4th-speed drive gear 21, the third driven gear 28 is always meshed with the 5th-speed drive gear 14 and the 6th-speed drive gear 22, the fourth driven gear 29 is always meshed with the 1st-and 3rd-speed drive gear 13, and the fifth driven gear 30 is always meshed with the 8th-and 10th-speed drive gear 23. Consequently, the driven gears, together with the drive gears described above, function as speed-change step gears for transmitting the rotation from the first speed-change shaft 12 or second speed-change shaft 20 to the output shaft 7.

The seventh and eighth coupling sleeves C7, C8 are clutches for moving in the axial direction and fixing the driven gears to the speed change idle shaft 8 so as to be incapable of relative rotation.

Specifically, the seventh coupling sleeve C7 is a clutch for activating and deactivating coupling between the speed change idle shaft 8 and the first and second driven gears 26, 27, and the eighth coupling sleeve C8 is a clutch for activating and deactivating coupling between the speed change idle shaft 8 and the fourth and fifth driven gears 29, 30. The seventh and eighth coupling sleeves C7, C8 are moved by a third shift actuator SA3 (see FIG. 1).

A parking brake 32 is provided to the rear end (the end on the opposite side from the engine 51) of the speed change idle shaft 8.

Output Idle Shaft 9

The output idle shaft 9 is supported by a pair of bearings so as to be able to rotate with respect to the housing 10, in the same manner as the other shafts. As is apparent in FIG. 3, the output idle shaft 9 is disposed below and parallel to the speed change idle shaft 8, and is decentered toward the left side (second speed-change shaft 20 side) as viewed from the rear. First and second output idle gears 35, 36 are fixed to the output idle shaft 9. The first output idle gear 35 is meshed with the third driven gear 28 of the speed change idle shaft 8.

Output Shaft 7

The output shaft 7 is supported by a pair of bearings so as to be able to rotate with respect to the housing 10, in the same manner as the other shafts, and output flanges 40, 41 connected to members on the accelerator side are mounted at both ends of the output shaft 7. As is apparent in FIG. 3, the output shaft 7 is disposed below the output idle shaft 9 and parallel to the shafts, and on the same vertical line as the input shaft 2 and the speed change idle shaft 8. An output gear 42 is fixed to the output shaft 7, and the output gear 42 is meshed with the second output idle gear 36 of the output idle shaft 9. The rotation from the first speed-change shaft 12 and the second speed-change shaft 20 is inputted to the output shaft 7 via the speed change idle shaft 8 and the output idle shaft 9.

Clutch Mechanism 5

The clutch mechanism 5 is a mechanism for switching between transmission and non-transmission of rotation from the input shaft 2 to the first speed-change shaft 12, and between transmission and non-transmission of rotation from the input shaft 2 to the second speed-change shaft 20, and has a first clutch pair 5F provided concentrically with the input shaft 2, and a second clutch pair 5R provided concentrically with the second speed-change shaft 20 of the second transmission mechanism 4.

First Clutch Pair: Forward Clutch+First Snap Clutch SC1

As is apparent in FIG. 4, the first clutch pair 5F has a forward clutch F that is engaged (transmitting power) during forward travel, and the first snap clutch SC1 for switching between transmission and non-transmission of rotation from the input shaft to the first speed-change shaft 12. The forward clutch F and the first snap clutch SC1 are both hydraulic multiple-disc clutches, and are provided concentrically with each other. The forward clutch F can control the transmission torque capacity by controlling the oil pressure fed via a forward clutch control valve not shown in the drawing. The first snap clutch SC1 can control the transmission torque capacity by controlling the oil pressure fed via the first clutch control valve CV1 (see FIG. 1).

More specifically, the forward clutch F has a forward input gear FG fixed to the input shaft 2 so as to be incapable of relative rotation, a clutch case 45 provided so as to be able to be capable of relative rotation about the input shaft 2, and a plurality of clutch plates provided between the forward input gear FG and the clutch case 45.

The first snap clutch SC1 shares the clutch case 45 with the forward clutch F, and has an intermediate gear 46 supported so as to be able to rotate relative to the input shaft 2, and a plurality of clutch plates provided between the clutch case 45 and the intermediate gear 46. The intermediate gear 46 has a first intermediate gear 46a provided to the input side, and a second intermediate gear 46b provided to the output side. The first intermediate gear 46a meshes with the first synchro gear 24a of the synchro mechanism 24, and the second intermediate gear 46b meshes with the second synchro gear 24b of the synchro mechanism 24. The first intermediate gear 46a and the second intermediate gear 46b are formed integrally with each other. A clutch case gear 47 is formed on the external periphery of the clutch case 45 at the end on the output side (the right side in FIG. 2) thereof.

In such a configuration, activation of the forward clutch F enables power to be transmitted between the forward input gear FG (i.e., the input shaft 2) and the clutch case 45. Activation of the first snap clutch SC1 enables power to be transmitted between the clutch case 45 and the intermediate gear 46.

Second Clutch Pair: Reverse Clutch & Second Snap Clutch SC2

As is apparent in FIG. 4, the second clutch pair 5R has a reverse clutch R that is engaged (transmitting power) during reverse travel, and the second snap clutch SC2 for switching between transmission and non-transmission of rotation from the input shaft to the second speed-change shaft. The reverse clutch R and the second snap clutch SC2 are both hydraulic multi-disc clutches, and are provided concentrically with each other. The reverse clutch R can control the transmission torque capacity by controlling the oil pressure fed via a reverse clutch control valve not shown in the drawing. The second snap clutch SC2 can control the transmission torque capacity by controlling the oil pressure fed via the second clutch control valve CV2 (see FIG. 1).

More specifically, the reverse clutch R has a clutch shaft 48 provided concentrically with the second speed-change shaft 20; a reverse input gear RG supported by the clutch shaft 48 so as to be capable of relative rotation; a clutch case 49 provided so as to be capable of relative rotation about the clutch shaft 48; and a plurality of clutch plates provided between the reverse input gear RG and the clutch case 49. A spline hole is formed at the end on the output side (right side in FIG. 2) of the clutch shaft 48, and a splined shaft formed at the distal end of the second speed-change shaft 20 is engaged in the spline hole. The reverse input gear RG is coupled to the forward input gear FG via an idle gear IG (see FIGS. 3 and 4) that is rotatably supported by the housing 10.

The second snap clutch SC2 shares the clutch case 49 with the reverse clutch R, and has a plurality of clutch plates provided between the clutch case 49 and the clutch shaft 48. A clutch case gear 50 is formed on the external periphery of the clutch case 49 at the end on the output side (the right side in FIG. 2) thereof, and the clutch case gear 50 is meshed with the clutch case gear 47 of the first snap clutch SC1.

In such a configuration, activation of the reverse clutch R enables power to be transmitted between the reverse input gear RG (i.e., the input shaft 2) and the clutch case 49. Activation of the second snap clutch SC2 enables power to be transmitted between the clutch case 49 and the second speed-change shaft 20.

Rotation Direction Switching Mechanism

The rotation direction switching mechanism 6 is a mechanism for switching the direction of rotation input to the first transmission mechanism 3 or the second transmission mechanism 4 to the forward rotation direction or the reverse rotation direction in accordance with switching between forward and reverse travel by the clutch mechanism 5. As shown in FIG. 4, the rotation direction switching mechanism 6 has a first gear 52 for inputting rotation in the same direction to the first clutch pair 5F and the second clutch pair 5R; a second gear 53 for changing the output rotation of the first clutch pair 5F and the second clutch pair 5R to opposite directions from each other and transmitting the rotation to the other of the first clutch pair 5F and the second clutch pair 5R; and a third gear 54 for changing the rotation direction of the output of the first clutch pair 5F to the opposite direction and inputting the rotation to the first transmission mechanism 3.

Specifically, the first gear 52 is a gear composed of the forward input gear FG, the idle gear IG, and the reverse input gear RG, the second gear 53 is a gear composed of the clutch case gear 47 of the first snap clutch SC1 and the clutch case gear 50 of the second snap clutch SC2, and the third gear 54 is a gear composed of the intermediate gear 46 and the speed reduction gear 16 that is provided to the first transmission mechanism 3.

Power Transmission Pathways in Transmission 1: Input-Side Shared Pathway The input transmission pathways of the transmission 1 configured as described above will next be described. The shared pathway in each speed-change step, i.e., the power transmission path from the input shaft 2 to the transmission mechanisms 3, 4, will first be described.

Forward Clutch Engaged & First Snap Clutch SC1 Engaged

When the forward clutch F and the first snap clutch SC1 are engaged (other clutches are disengaged), the rotation from the input shaft 2 is transmitted to the intermediate gear 46 via the forward clutch F and the first snap clutch SC1 and furthermore inputted to the first speed-change shaft 12 via the speed reduction gear 16 that meshes with the intermediate gear 46.

The rotation directions at this time are such that when the rotation direction of the engine 51 is designated as a first direction (the same in all instances hereinafter), the input shaft 2 and the intermediate gear 46 rotate in the first direction, and the first speed-change shaft 12 rotates in a second direction (forward travel).

Forward Clutch Engaged & Second Snap Clutch SC2 Engaged

When the forward clutch F and the second snap clutch SC2 are engaged (other clutches are disengaged), the rotation from the input shaft 2 is transmitted to the clutch shaft 48 via the forward clutch F and the second snap clutch SC2 and furthermore inputted to the first speed-change shaft 12 that is spline-connected to the clutch shaft 48.

As for the rotation directions at this time, since the input shaft 2 and the clutch case gear 47 of the first snap clutch SC1 rotate in the first direction, the clutch shaft 48 and the clutch case gear 50 of the second snap clutch SC2 rotate in the second direction, and the second speed-change shaft 20 rotates in the second direction (forward travel).

Reverse Clutch Engaged & First Snap Clutch SC1 Engaged

When the reverse clutch R and the first snap clutch SC1 are engaged (other clutches are disengaged), the rotation from the input shaft 2 is inputted to the reverse clutch R via the forward input gear FG, the idle gear IG, and the reverse input gear RG. The rotation of the reverse clutch R is inputted to the first snap clutch SC1 via the meshing of both clutch case gears 47, 50. This rotation is transmitted to the intermediate gear 46 and furthermore inputted to the first speed-change shaft 12 via the speed reduction gear 16 that meshes with the intermediate gear 46.

As for the rotation directions at this time, since the input shaft 2 rotates in the first direction, the clutch shaft 48 and the reverse clutch R (second snap clutch SC2) also rotate in the first direction, and the first snap clutch SC1 accordingly rotates in the second direction. Consequently, the first speed-change shaft 12 rotates in the first direction (reverse travel).

Reverse Clutch Engaged & Second Snap Clutch SC2 Engaged

When the reverse clutch R and the second snap clutch SC2 are engaged (other clutches are disengaged), the rotation from the input shaft 2 is inputted to the reverse clutch R via the forward input gear FG, the idle gear IG, and the reverse input gear RG. The rotation of the reverse clutch R is inputted to the clutch shaft 48 and the second speed-change shaft 20 via the second snap clutch SC2.

As for the rotation directions at this time, since the input shaft 2 rotates in the First direction, the clutch shaft 48 and the reverse clutch R (second snap clutch SC2) also rotate in the first direction, and the clutch shaft 48 and the second speed-change shaft 20 accordingly rotate in the first direction (reverse travel).

Power Transmission Pathways in Transmission 1: Speed-Change Steps

The speed of the rotation inputted to the first speed-change shaft 12 or the second speed-change shaft 20 as described above is changed as described below in each speed-change step.

Forward First Speed

Figure 6:
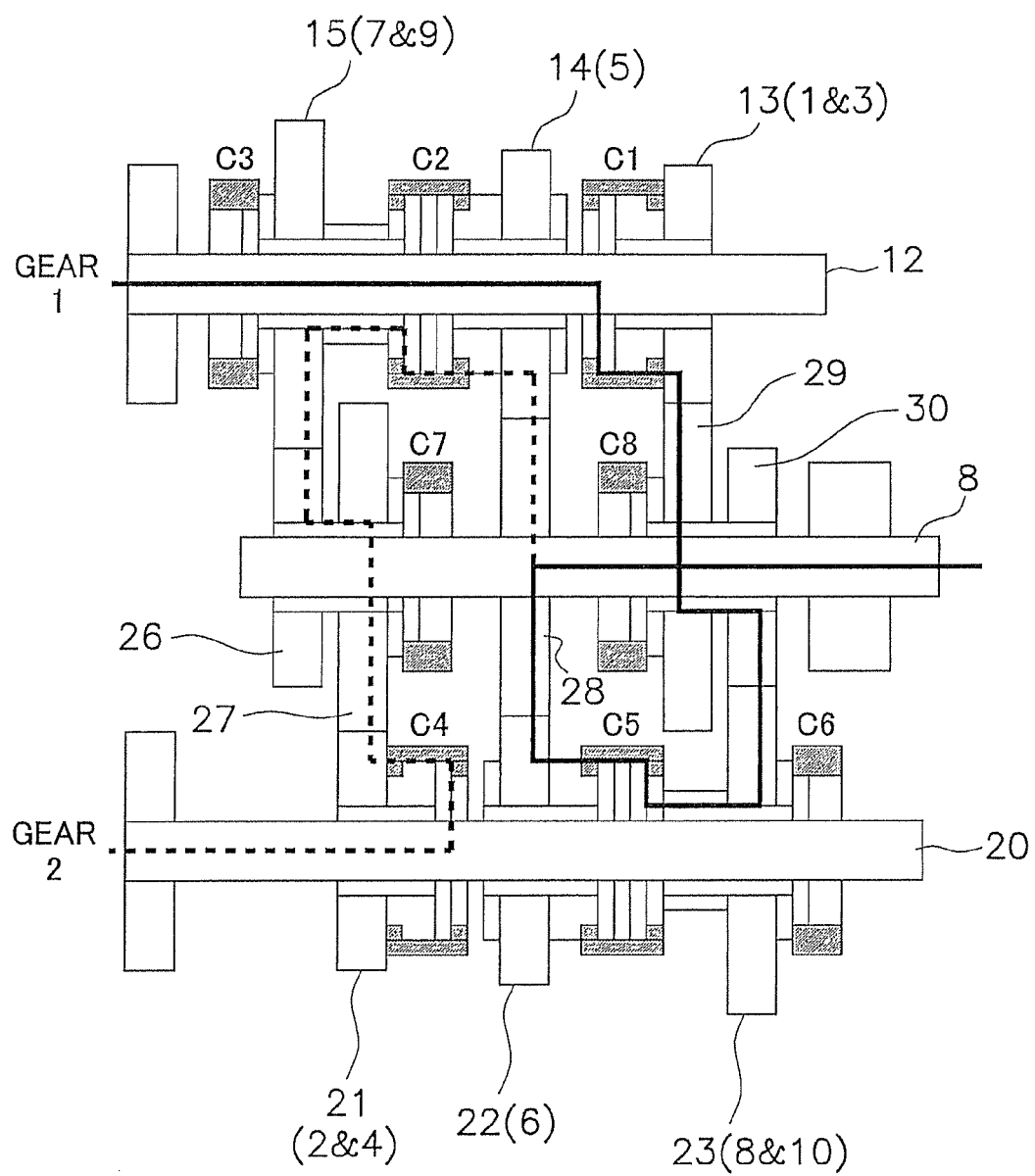
FIG. 6 is a schematic view showing the power transmission pathway in each speed-change step of the transmission.

In the case of the forward first speed, the forward clutch F and the first snap clutch SC1 are activated, and the other clutches are deactivated. In this case, rotation in the second direction is inputted to the first speed-change shaft 12, as previously described. In the forward first speed, the coupling sleeves are controlled so that coupling is activated (coupled) between the members described below, as shown in FIG. 6.

First coupling sleeve C1: first speed-change shaft 12+1st- and 3rd-speed drive gear 13

Second coupling sleeve C2: 5th-speed drive gear 14+7th- and 9th-speed drive gear 15

Fourth coupling sleeve C4: second speed-change shaft 20+2nd and 4th-speed drive gear 21

Fifth coupling sleeve C5: 6th-speed drive gear 22+8th-and 10th-speed drive gear 23

Other coupling sleeves: disengaged

In this arrangement, the rotation inputted to the first speed-change shaft 12 is transmitted to the speed change idle shaft 8 by the path described below. The power transmission pathway is indicated by the solid line in FIG. 6. The rotation transmission path on the side of the second transmission mechanism 4 for this case is indicated by the dotted line. The path indicated by the dotted line is the rotation transmission path of the second speed, and indicates that pre-shifting has occurred. Pre-shifting will be described in detail hereinafter.

First speed-change shaft 12→first coupling sleeve C1→1st-and 3rd-speed drive gear 13→fourth and fifth driven gears 29, 30→8th-and 10th-speed drive gear 23→fifth coupling sleeve C5→6th-speed drive gear 22→third driven gear 28→speed change idle shaft 8

Forward Second Speed

Figure 7:
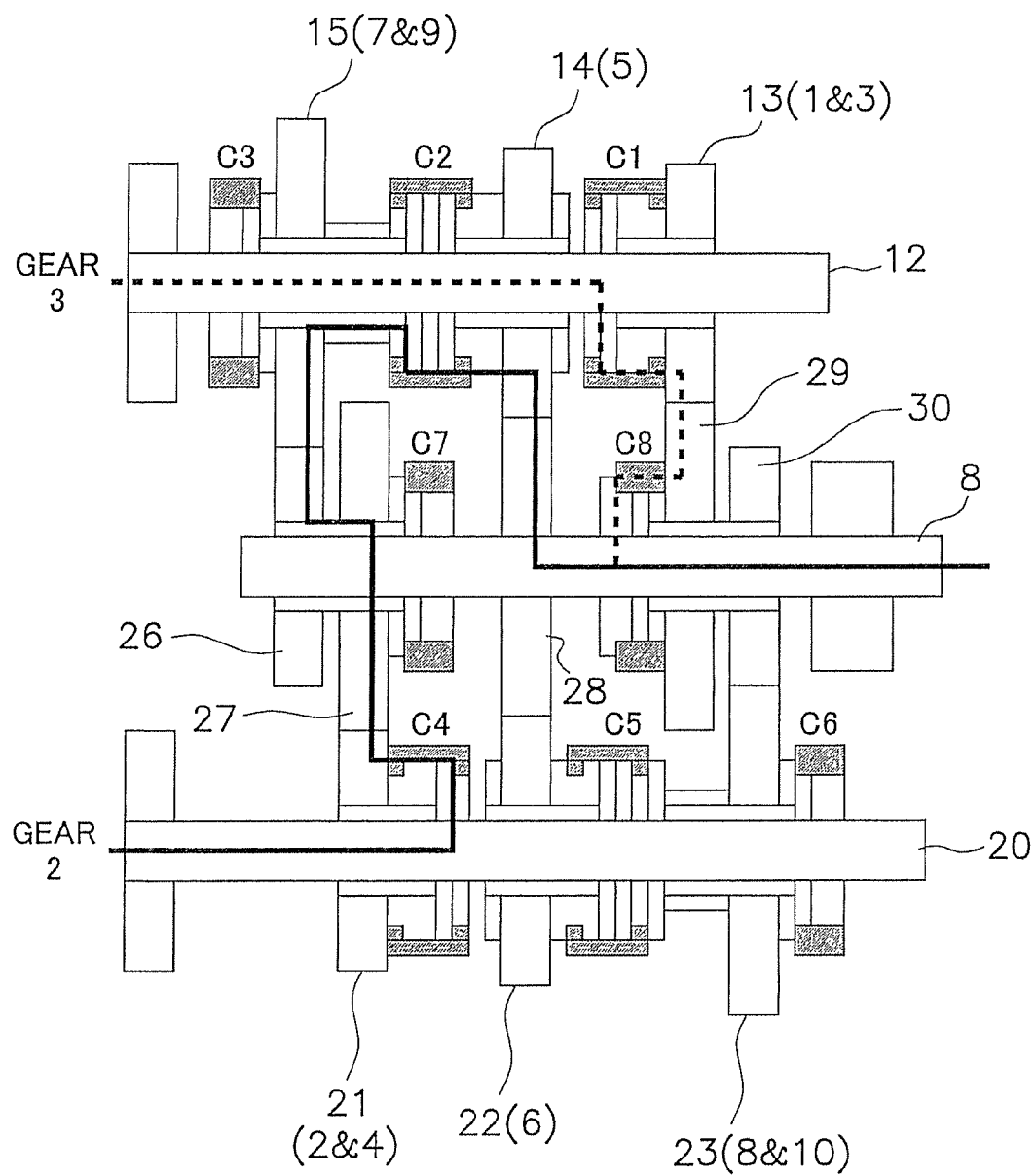
FIG. 7 is a schematic view showing the power transmission pathway in each speed-change step of the transmission.

In the case of the forward second speed, the forward clutch F and the second snap clutch SC2 are activated, and the other clutches are deactivated. In this case, rotation in the second direction is inputted to the second speed-change shaft 20, as previously described. In the forward second speed, the coupling sleeves are controlled so that coupling is activated (coupled) between the members described below, as shown in FIG. 7.

First coupling sleeve C1: first speed-change shaft 12+1st- and 3rd-speed drive gear 13

Second coupling sleeve C2: 5th-speed drive gear 14+7th- and 9th-speed drive gear 15

Fourth coupling sleeve C4: second speed-change shaft 20+2nd and 4th-speed drive gear 21

Eighth coupling sleeve C8: fourth driven gear 29+speed change idle shaft 8

Other coupling sleeves: disengaged

In this arrangement, the rotation inputted to the second speed-change shaft 20 is transmitted to the speed change idle shaft 8 by the path described below. The power transmission pathway is indicated by the solid line in FIG. 7. The rotation transmission path on the side of the first transmission mechanism 3 for this case is indicated by the dotted line. The path indicated by the dotted line is the rotation transmission path of the third speed, and indicates that pre-shifting has occurred.

Second speed-change shaft 20→fourth coupling sleeve C4→2nd and 4th-speed drive gear 21→first and second driven gears 26, 27→7th-and 9th-speed drive gear 15→second coupling sleeve C2→5th-speed drive gear 14→third driven gear 28→speed change idle shaft 8

Forward Third Speed

Figure 8:
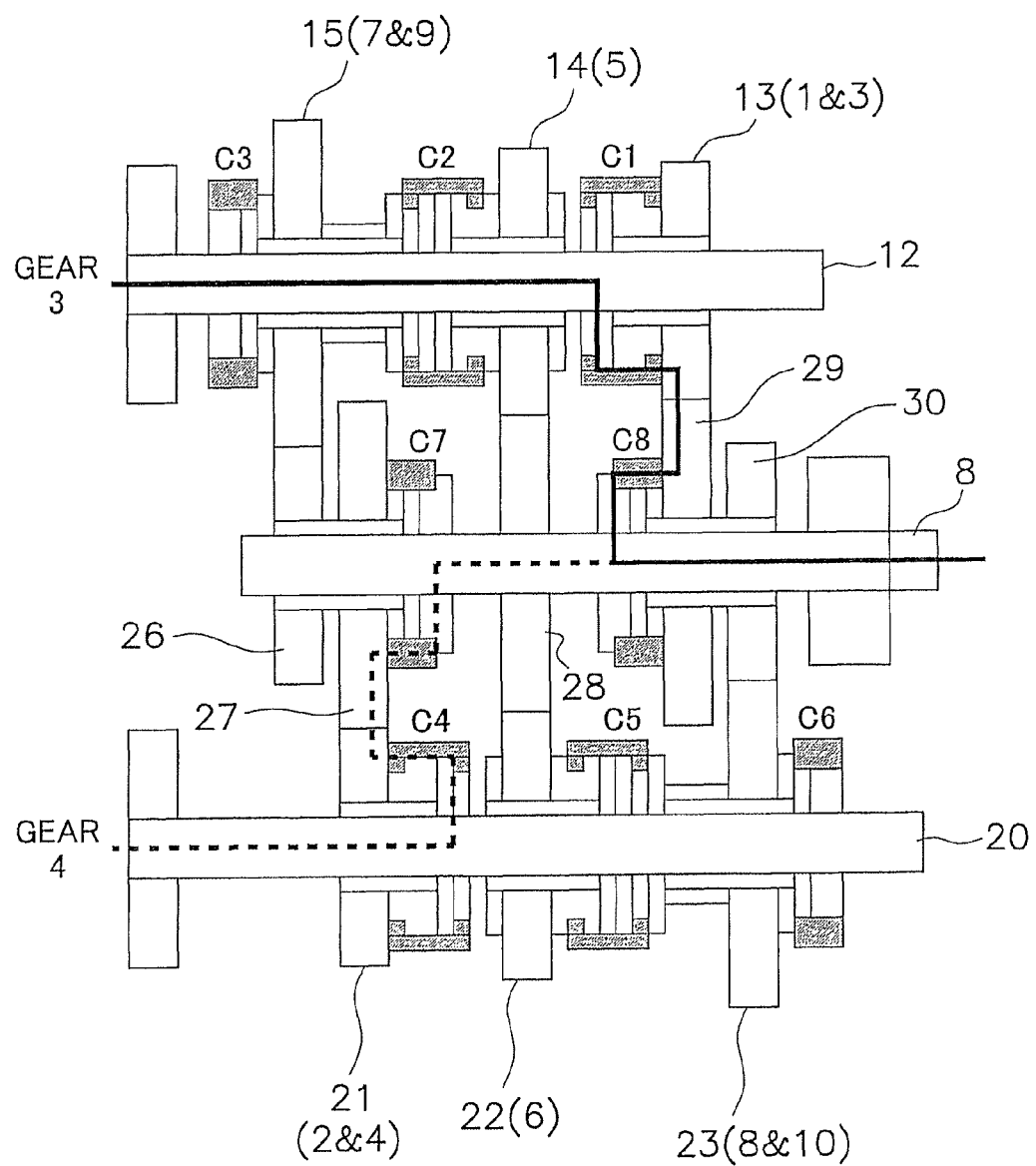
FIG. 8 is a schematic view showing the power transmission pathway in each speed-change step of the transmission.

In the case of the forward third speed, the forward clutch F and the first snap clutch SC1 are activated, and the other clutches are deactivated. In this case, rotation in the second direction is inputted to the first speed-change shaft 12, as previously described. In the forward third speed, the coupling sleeves are controlled so that coupling is activated (coupled) between the members described below, as shown in FIG. 8.

First coupling sleeve C1: first speed-change shaft 12+1st- and 3rd-speed drive gear 13

Fourth coupling sleeve C4: second speed-change shaft 20+2nd and 4th-speed drive gear 21

Seventh coupling sleeve C7: second driven gear 27+speed change idle shaft 8

Eighth coupling sleeve C8: fourth driven gear 29+speed change idle shaft 8

Other coupling sleeves: disengaged

In this arrangement, the rotation inputted to the first speed-change shaft 12 is transmitted to the speed change idle shaft 8 by the path described below. The power transmission pathway is indicated by the solid line in FIG. 8. The rotation transmission path on the side of the second transmission mechanism 4 for this case is indicated by the dotted line. The path indicated by the dotted line is the rotation transmission path of the fourth speed, and indicates that pre-shifting has occurred.

First speed-change shaft 12→first coupling sleeve C1→1st-and 3rd-speed drive gear 13→fourth driven gear 29→eighth coupling sleeve C8→speed change idle shaft 8

Forward Fourth Speed

Figure 9:
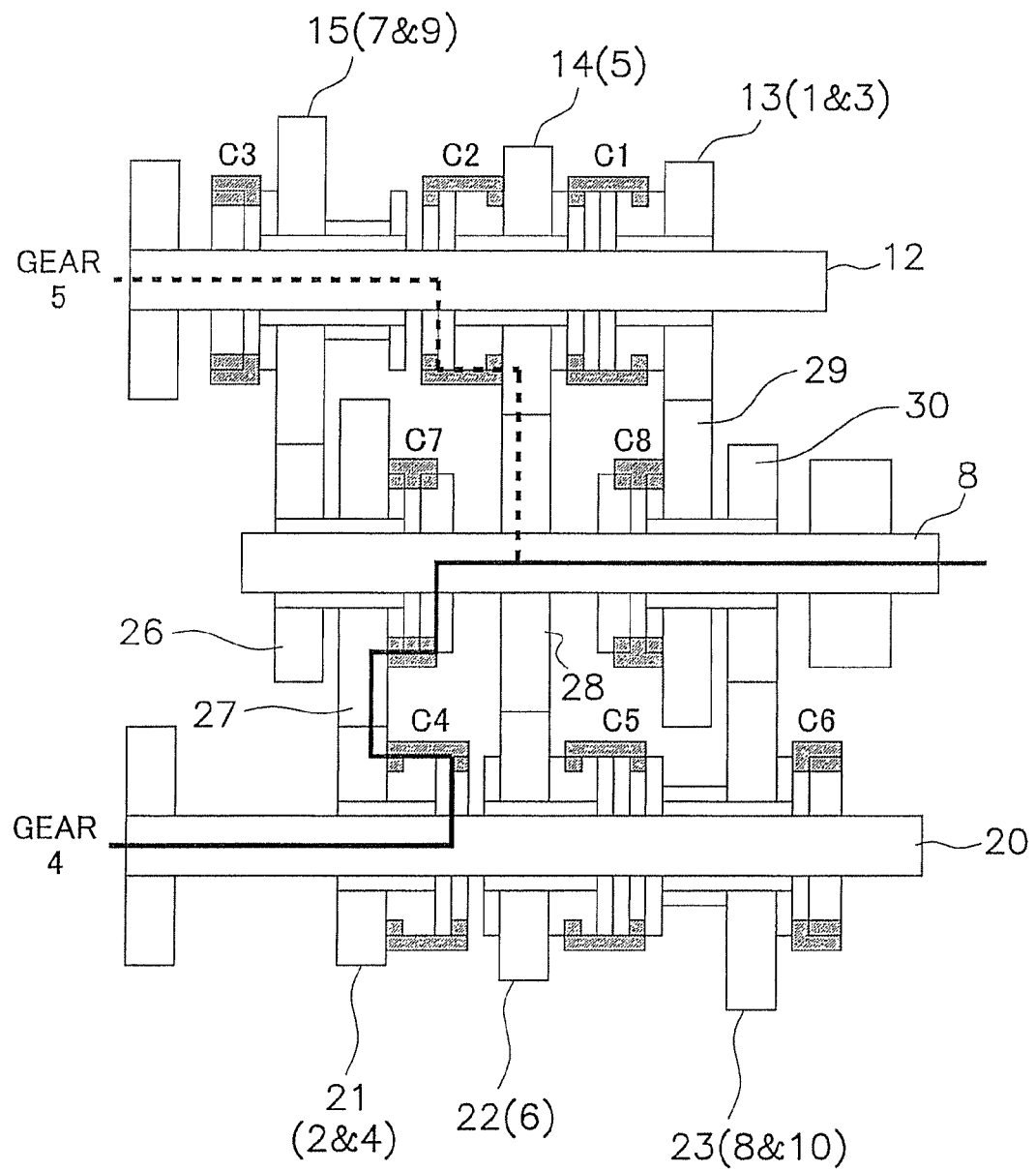
FIG. 9 is a schematic view showing the power transmission pathway in each speed-change step of the transmission.

In the case of the forward fourth speed, the forward clutch F and the second snap clutch SC2 are activated, and the other clutches are deactivated. In this case, rotation in the second direction is inputted to the second speed-change shaft 20, as previously described. In the forward fourth speed, the coupling sleeves are controlled so that coupling is activated (coupled) between the members described below, as shown in FIG. 9.

Second coupling sleeve C2: first speed-change shaft 12+5th-speed drive gear 14

Fourth coupling sleeve C4: second speed-change shaft 20+2nd and 4th-speed drive gear 21

Seventh coupling sleeve C7: second driven gear 27+speed change idle shaft 8

Other coupling sleeves: disengaged

In this arrangement, the rotation inputted to the second speed-change shaft 20 is transmitted to the speed change idle shaft 8 by the path described below. The power transmission pathway is indicated by the solid line in FIG. 9. The rotation transmission path on the side of the first transmission mechanism 3 for this case is indicated by the dotted line. The path indicated by the dotted line is the rotation transmission path of the fifth speed, and indicates that pre-shifting has occurred.

Second speed-change shaft 20→fourth coupling sleeve C4→2nd and 4th-speed drive gear 21 second driven gear 27→seventh coupling sleeve C7→speed change idle shaft 8

Forward Fifth Speed

Figure 10:
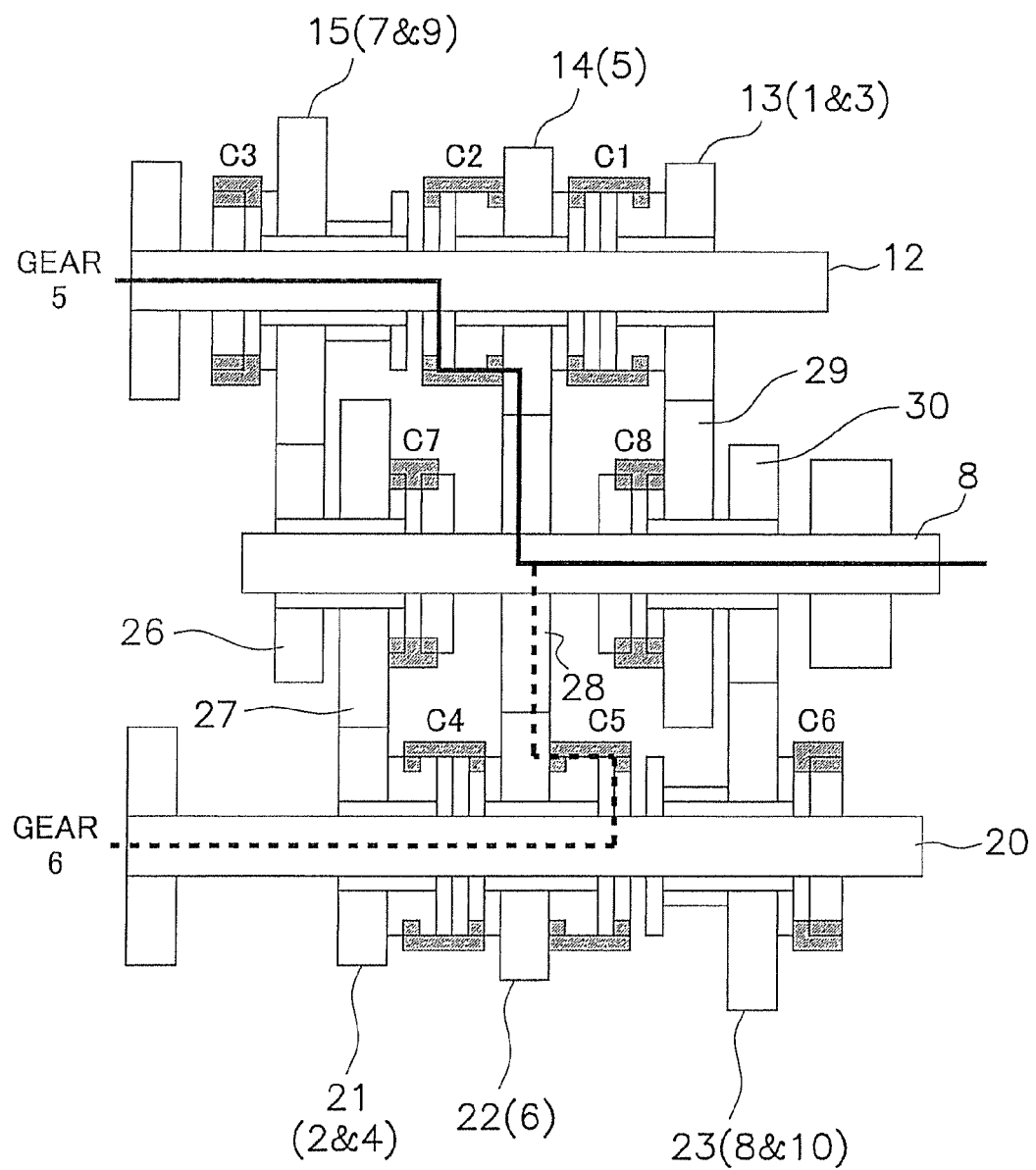
FIG. 10 is a schematic view showing the power transmission pathway in each speed-change step of the transmission.

In the case of the forward fifth speed, the forward clutch F and the first snap clutch SC1 are activated, and the other clutches are deactivated. In this case, rotation in the second direction is inputted to the first speed-change shaft 12, as previously described. In the forward fifth speed, the coupling sleeves are controlled so that coupling is activated (coupled) between the members described below, as shown in FIG. 10.

Second coupling sleeve C2: first speed-change shaft 12+5th-speed drive gear 14

Fifth coupling sleeve C5: second speed-change shaft 20+6th-speed drive gear 22

Other coupling sleeves: disengaged

In this arrangement, the rotation inputted to the first speed-change shaft 12 is transmitted to the speed change idle shaft 8 by the path described below. The power transmission pathway is indicated by the solid line in FIG. 10. The rotation transmission path on the side of the second transmission mechanism 4 for this case is indicated by the dotted line. The path indicated by the dotted line is the rotation transmission path of the sixth speed, and indicates that pre-shifting has occurred.

First speed-change shaft 12→second coupling sleeve C2→5th-speed drive gear 14→third driven gear 28→speed change idle shaft 8

Forward Sixth Speed

Figure 11:
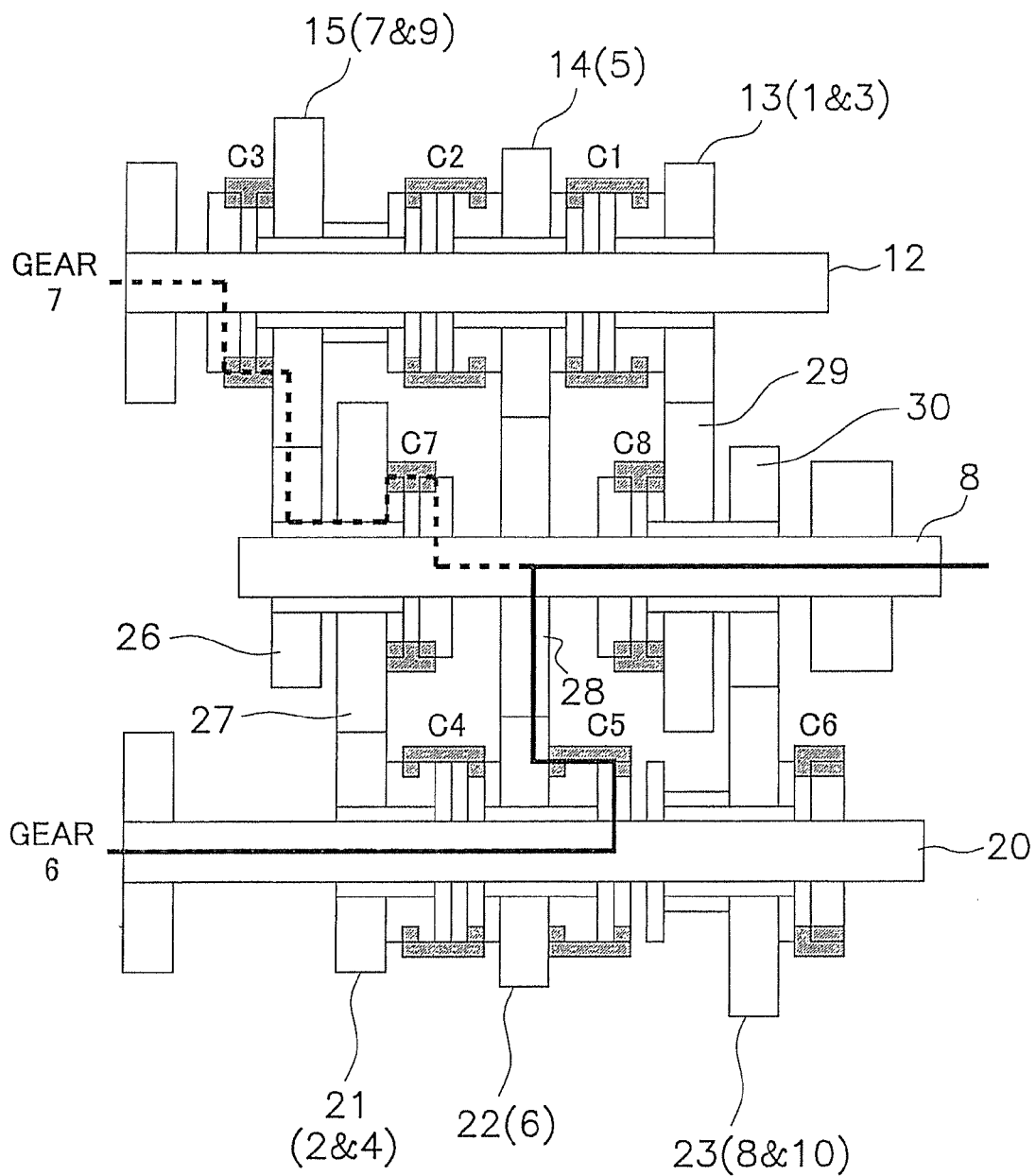
FIG. 11 is a schematic view showing the power transmission pathway in each speed-change step of the transmission.

In the case of the forward sixth speed, the forward clutch F and the second snap clutch SC2 are activated, and the other clutches are deactivated. In this case, rotation in the second direction is inputted to the second speed-change shaft 20, as previously described. In the forward sixth speed, the coupling sleeves are controlled so that coupling is activated (coupled) between the members described below, as shown in FIG. 11.

Third coupling sleeve C3: first speed-change shaft 12+7th- and 9th-speed drive gear 15

Fifth coupling sleeve C5: second speed-change shaft 20+6th-speed drive gear 22

Seventh coupling sleeve C7: first and second driven gears 26, 27+speed change idle shaft 8

Other coupling sleeves: disengaged

In this arrangement, the rotation inputted to the second speed-change shaft 20 is transmitted to the speed change idle shaft 8 by the path described below. The power transmission pathway is indicated by the solid line in FIG. 11. The rotation transmission path on the side of the first transmission mechanism 3 for this case is indicated by the dotted line. The path indicated by the dotted line is the rotation transmission path of the seventh speed, and indicates that pre-shifting has occurred.

Second speed-change shaft 20→fifth coupling sleeve C5→6th-speed drive gear 22→third driven gear 28→speed change idle shaft 8

Forward Seventh Speed

Figure 12:
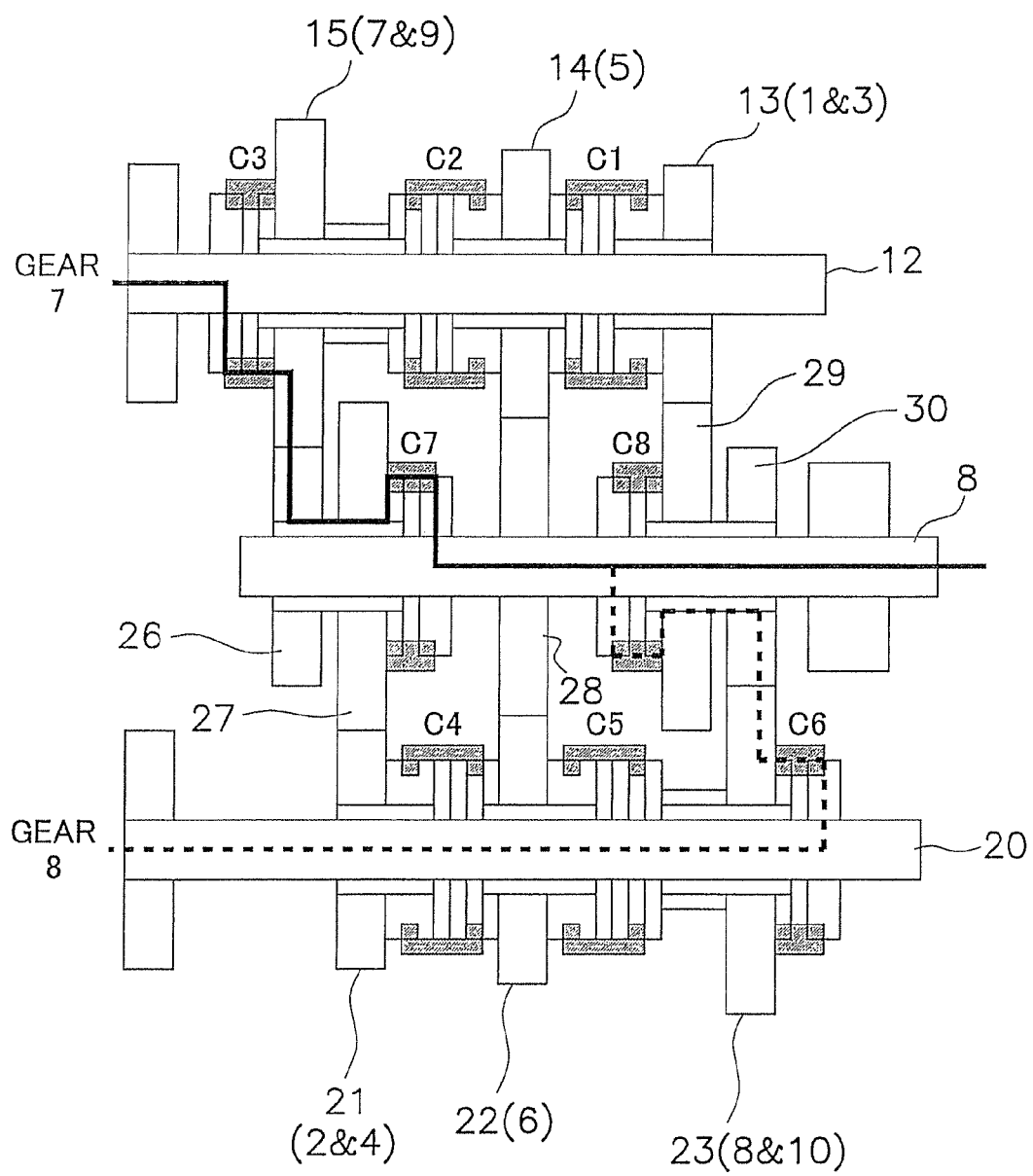
FIG. 12 is a schematic view showing the power transmission pathway in each speed-change step of the transmission.

In the case of the forward seventh speed, the forward clutch F and the first snap clutch SC1 are activated, and the other clutches are deactivated. In this case, rotation in the second direction is inputted to the first speed-change shaft 12, as previously described. In the forward seventh speed, the coupling sleeves are controlled so that coupling is activated (coupled) between the members described below, as shown in FIG. 12.

Third coupling sleeve C3: first speed-change shaft 12+7th- and 9th-speed drive gear 15

Sixth coupling sleeve C6: second speed-change shaft 20+8th- and 10th-speed drive gear 23

Seventh coupling sleeve C7: first and second driven gears 26, 27+speed change idle shaft 8

Other coupling sleeves: disengaged

In this arrangement, the rotation inputted to the first speed-change shaft 12 is transmitted to the speed change idle shaft 8 by the path described below. The power transmission pathway is indicated by the solid line in FIG. 12. The rotation transmission path on the side of the second transmission mechanism 4 for this case is indicated by the dotted line. The path indicated by the dotted line is the rotation transmission path of the eighth speed, and indicates that pre-shifting has occurred.

First speed-change shaft 12→third coupling sleeve C3→7th- and 9th-speed drive gear 15→first and second driven gears 26, 27→seventh coupling sleeve C7→speed change idle shaft 8

Forward Eighth Speed

Figure 13:
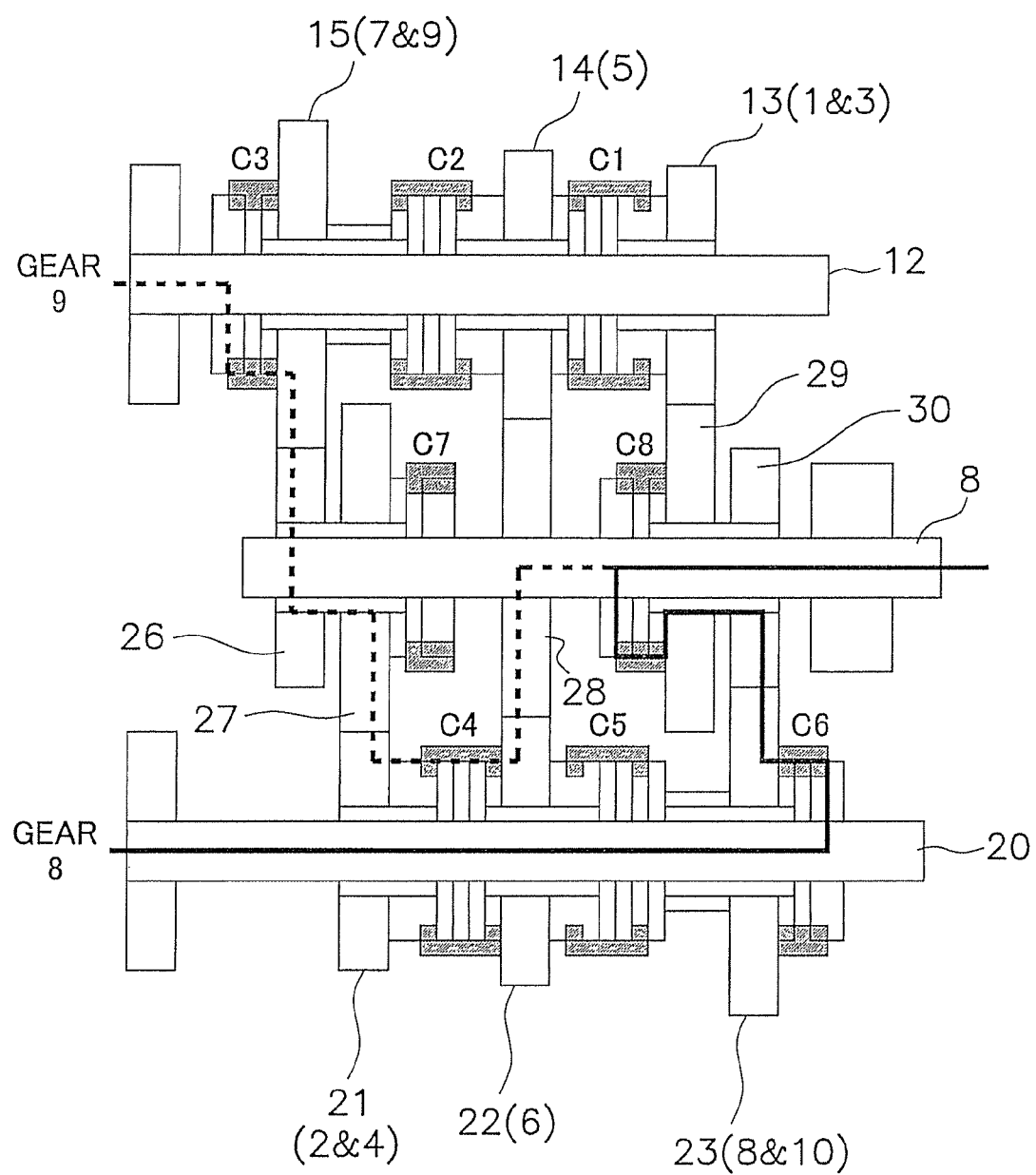
FIG. 13 is a schematic view showing the power transmission pathway in each speed-change step of the transmission.

In the case of the forward eighth speed, the forward clutch F and the second snap clutch SC2 are activated, and the other clutches are deactivated. In this case, rotation in the second direction is inputted to the second speed-change shaft 20, as previously described. In the forward eighth speed, the coupling sleeves are controlled so that coupling is activated (coupled) between the members described below, as shown in FIG. 13.

Third coupling sleeve C3: first speed-change shaft 12+7th- and 9th-speed drive gear 15

Fourth coupling sleeve C4: 2nd and 4th-speed drive gear 21+6th-speed drive gear 22

Sixth coupling sleeve C6: second speed-change shaft 20+8th- and 10th-speed drive gear 23

Eighth coupling sleeve C8: fourth and fifth driven gears 29, 30+speed change idle shaft 8

Other coupling sleeves: disengaged

In this arrangement, the rotation inputted to the second speed-change shaft 20 is transmitted to the speed change idle shaft 8 by the path described below. The power transmission pathway is indicated by the solid line in FIG. 13. The rotation transmission path on the side of the first transmission mechanism 3 for this case is indicated by the dotted line. The path indicated by the dotted line is the rotation transmission path of the ninth speed, and indicates that pre-shifting has occurred.

Second speed-change shaft 20→sixth coupling sleeve C6→8th- and 10th-speed drive gear 23→fourth and fifth driven gears 29, 30→eighth coupling sleeve C8→speed change idle shaft 8

Forward Ninth Speed

Figure 14:
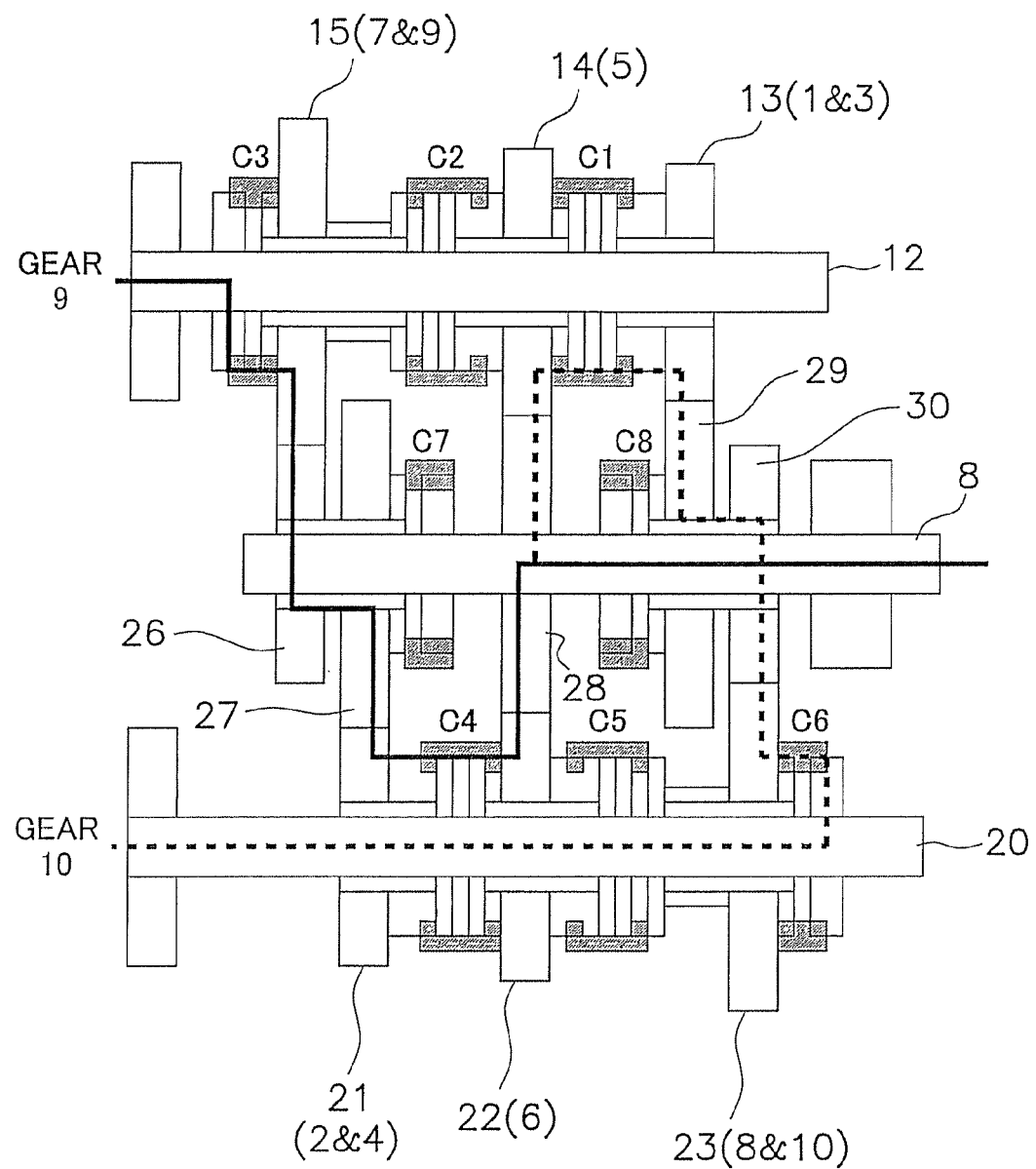
FIG. 14 is a schematic view showing the power transmission pathway in each speed-change step of the transmission.

In the case of the forward ninth speed, the forward clutch F and the first snap clutch SC1 are activated, and the other clutches are deactivated. In this case, rotation in the second direction is inputted to the first speed-change shaft 12, as previously described. In the forward ninth speed, the coupling sleeves are controlled so that coupling is activated (coupled) between the members described below, as shown in FIG. 14.

First coupling sleeve C1: 1st- and 3rd-speed drive gear 13+5th-speed drive gear 14

Third coupling sleeve C3: first speed-change shaft 12+7th- and 9th-speed drive gear 15

Fourth coupling sleeve C4: 2nd and 4th-speed drive gear 21+6th-speed drive gear 22

Sixth coupling sleeve C6: second speed-change shaft 20+8th-and 10th-speed drive gear 23

Other coupling sleeves: disengaged

In this arrangement, the rotation inputted to the first speed-change shaft 12 is transmitted to the speed change idle shaft 8 by the path described below. The power transmission pathway is indicated by the solid line in FIG. 14. The rotation transmission path on the side of the second transmission mechanism 4 for this case is indicated by the dotted line. The path indicated by the dotted line is the rotation transmission path of the tenth speed, and indicates that pre-shifting has occurred.

First speed-change shaft 12→third coupling sleeve C3→7th-and 9th-speed drive gear 15→first and second driven gears 26, 27→2nd and 4th-speed drive gear 21→fourth coupling sleeve C4→6th-speed drive gear 22→third driven gear 28→speed change idle shaft 8

Forward Tenth Speed

In the case of the forward tenth speed, the forward clutch F and the second snap clutch SC2 are activated, and the other clutches are deactivated. In this case, rotation in the second direction is inputted to the second speed-change shaft 20, as previously described. In the forward tenth speed, the engagement and disengagement states of the coupling sleeves are the same as in the forward ninth speed.

In this arrangement, the rotation inputted to the second speed-change shaft 20 is transmitted to the speed change idle shaft 8 by the path described below. The rotation transmission path on the side of the first transmission mechanism 3 for this case is the same as in the forward ninth speed.

Second speed-change shaft 20→sixth coupling sleeve C6→8th-and 10th-speed drive gear 23→fourth and fifth driven gears 29, 30→1st-and 3rd-speed drive gear 13→first coupling sleeve C1→5th-speed drive gear 14→third driven gear 28→speed change idle shaft 8

Reverse First Through Tenth Speeds

Reverse travel differs from forward travel in that the forward clutch F is deactivated, and the reverse clutch R is activated. Consequently, in the case of reverse travel, rotation in the opposite direction from that of forward travel is inputted to the first speed-change shaft 12 and the second speed-change shaft 20, but the power transmission pathways and the control of the coupling sleeves in each speed step are exactly the same as in the speed-change steps for forward travel.

Pre-shifting was performed during upshifting in the description of the power transmission pathways given above, but pre-shifting to a lower speed step is performed in the same manner during downshifting.

Power Transmission Pathways in Transmission 1: Output-Side Shared Pathway

The rotation outputted to the speed change idle shaft 8 in the speed-change steps is transmitted as described above to the output gear 42 via the output idle shaft 9, the second output idle gear 36, and the first output idle gear 35 that meshes with the third driven gear 28 of the speed change idle shaft 8, and the rotation is furthermore outputted to the accelerator via the output shaft 7 and the output flanges 40, 41.

Various Sensors, Operating Unit 56, Control Unit 55

The construction vehicle 100 is provided with various sensors SN1 through 11 and an operating unit 56 as described above, and the control unit 55 is capable of various types of operational control on the basis of signals from the sensors and the operating unit.

Figure 15:
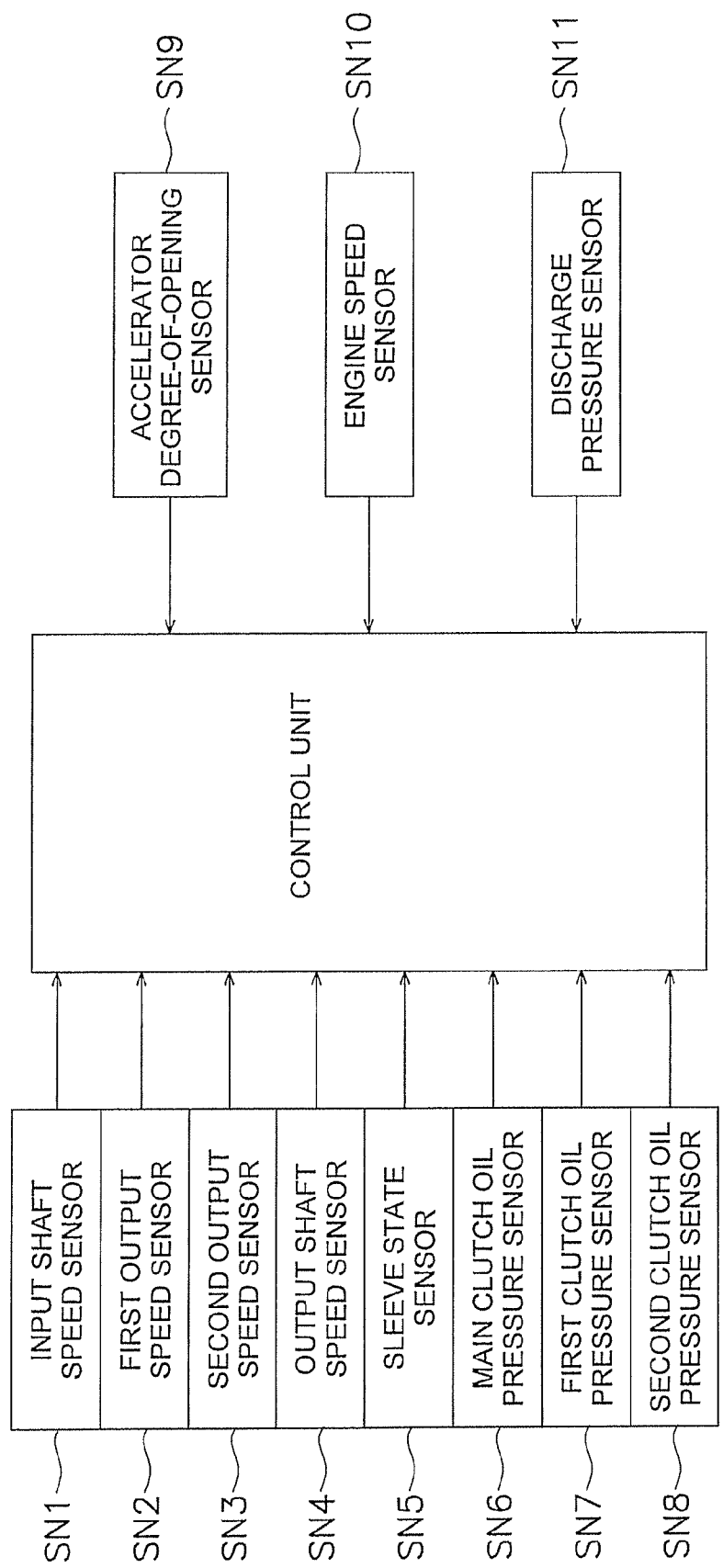
FIG. 15 is a block diagram showing the various sensors.

Specifically, the various sensors SN1 through 11 include an input shaft speed sensor SN1, a first output speed sensor SN2, a second output speed sensor SN3, an output shaft speed sensor SN4, a sleeve state sensor SN5, a main clutch oil pressure sensor SN6, a First clutch oil pressure sensor SN7, a second clutch oil pressure sensor SN8, an accelerator degree-of-opening sensor SN9, an engine speed sensor SN10, a discharge pressure sensor SN11, and the like as shown in FIG. 15, and the detection results of the sensors SN1 through SN11 are sent as detection signals to the control unit 55.

The input shaft speed sensor SN1 detects the output speed from the main clutch MC, i.e., the speed of the input shaft 2.

The first output speed sensor SN2 detects the output speed from the first snap clutch SC1, i.e., the speed of the first speed-change shaft 12.

The second output speed sensor SN3 detects the output speed from the second snap clutch SC2, i.e., the speed of the second speed-change shaft 20.

The output shaft speed sensor SN4 detects the rotation of the output shaft 7. The control unit 55 is capable of computing the vehicle speed from the speed of the output shaft 7, and the output shaft speed sensor SN4 therefore corresponds to the vehicle speed detecting section for detecting the vehicle speed.

The sleeve state sensor SN5 detects the phase of a barrel cam (not shown) provided to each of the coupling sleeves C1 through C8, and can thereby detect the state of coupling between the coupling sleeves C1 through C8 and the drive gears 13 through 15 and 21 through 23, and the driven gears 26, 27, 29, 30.

The main clutch oil pressure sensor SN6 detects the oil pressure fed to the main clutch via the main clutch control valve MCV.

The first clutch oil pressure sensor SN7 detects the oil pressure fed to the first snap clutch SC1 via the first clutch control valve CV1.

The second clutch oil pressure sensor SN8 detects the oil pressure fed to the second snap clutch SC2 via the second clutch control valve CV2.

The accelerator degree-of-opening sensor S1\19 detects the amount of operation of an accelerator provided within the cabin of the construction vehicle 100.

The engine speed sensor SN10 detects the speed of the engine 51.

The discharge pressure sensor SN11 detects the discharge pressure of the implement hydraulic pump 62.

The operating unit 56 is mounted inside the cabin not shown in the drawing, and has a direction lever, an accelerator pedal, a shift lever, and the like. The operating unit 56 sends the details of operation by an operator as operation signals to the control unit 55.

The control unit 55 controls the speed of the engine 51 and the discharge quantity of the implement hydraulic pump 62 on the basis of signals from the abovementioned various sensors and the operating unit 56 described above. The control unit 55 sends control signals to the main clutch control valve MCV, the first clutch control valve CV1, and the second clutch control valve CV2, and controls the oil pressure fed to the main clutch MC, the first snap clutch SC1, and the second snap clutch SC2. The control unit 55 can thereby control the transmission torque capacity and the switching between the coupling and non-coupling of the clutches in the transmission 1 such as described above. The control unit 55 can also control the movement of the coupling sleeves C1 through C8 by controlling the shift actuators SA1, SA2, SA3 for moving shift forks that are provided to the coupling sleeves C1 through C8. The first shift actuator SA1 is driven by oil pressure fed from the control hydraulic pump 64, and can move the first through third coupling sleeves C1 through C3. The second shift actuator SA2 is driven by oil pressure fed from the control hydraulic pump 64, and can move the fourth through sixth coupling sleeves C4 through C6. The third shift actuator SA3 is driven by oil pressure fed from the control hydraulic pump 64, and can move the seventh and eighth coupling sleeves C7, C8.

Pre-Shifting

As previously mentioned, the construction vehicle 100 is configured so that rotation is inputted to the first speed-change shaft 12 and the first transmission mechanism 3 for odd-numbered speed-change steps, and rotation is inputted to the second speed-change shaft 20 and the second transmission mechanism 4 for even-numbered speed-change steps. When switching of the speed-change step from the current speed step to the next target speed step, pre-shifting is performed in the transmission mechanism that is assigned to the target speed-change step, and the synchro mechanism 24 is used to enable smooth meshing of the coupling sleeves.

This pre-shifting is performed in a state in which the drive gear ("current speed-change step gear" hereinafter) that corresponds to the current speed step among the plurality of drive gears 13 through 15 and 21 through 23 is coupled with the one speed-change shaft ("current speed-change shaft" hereinafter) that corresponds to the current speed-change step gear among the first speed-change shaft 12 and the second speed-change shaft 20, and rotation can be transmitted between the input shaft 2 and the current speed-change shaft. In this state, the control unit 55 performs pre-shifting for coupling the other speed-change shaft ("target speed-change shaft" hereinafter) that corresponds to the target speed step and is incapable of transmitting rotation with the input shaft 2, with the drive gear ("target speed-change step gear" hereinafter) that corresponds to the target speed step among the plurality of drive gears 13 through 15 and 21 through 23. After the control unit 55 has performed pre-shifting, the control unit 55 switches the speed-change step by disabling transmission of rotation between the input shaft 2 and the current speed-change shaft and enabling transmission of rotation between the input shaft 2 and the target speed-change shaft.

FIGS. 16 through 20 will next be used to describe pre-shifting and the operation of the synchro mechanism in an example of shifting from the fifth speed as the current speed step to the fourth speed as the target speed step.

Figure 16:
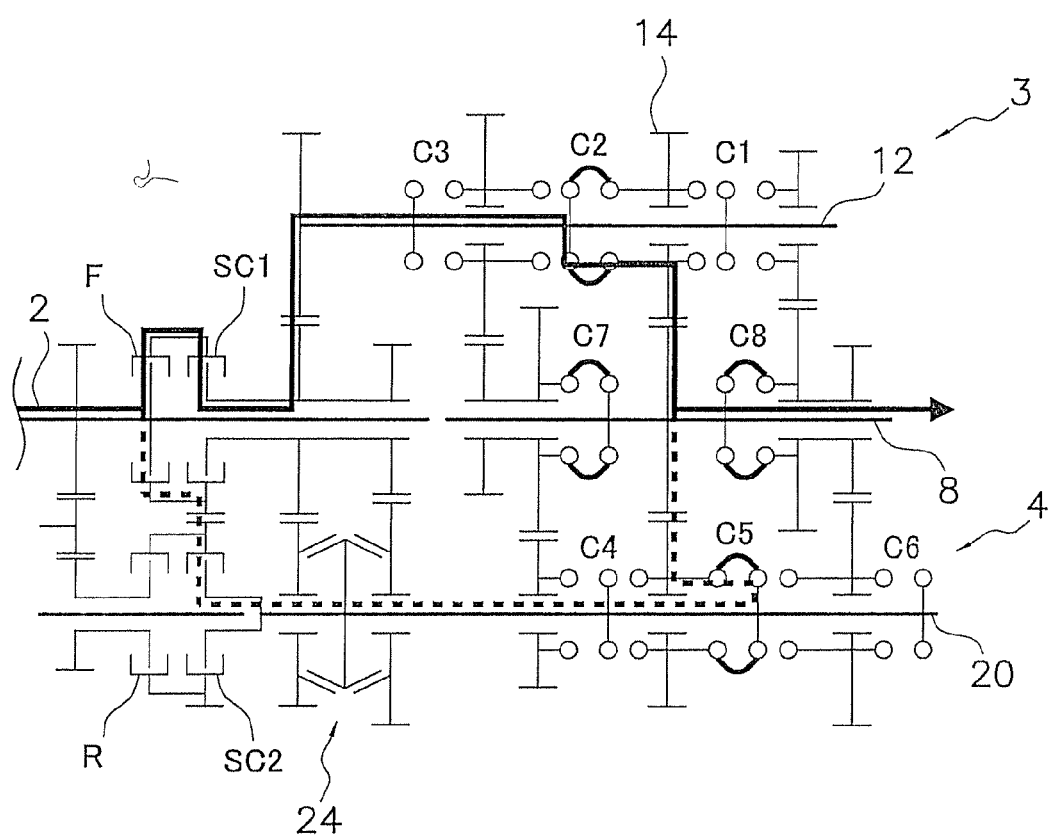
FIG. 16 is a view showing the operation of the transmission during speed changing.

In the fifth speed, power is transmitted by a path such as the one indicated by the solid line in FIG. 16. In this case, the 5th-speed drive gear 14 (current speed-change step gear) and the first speed-change shaft 12 (current speed-change shaft) are coupled by the second coupling sleeve C2. The forward clutch F and the first snap clutch SC1 are also engaged, and transmission of rotation from the input shaft 2 to the first speed-change shaft 12 is enabled. The other clutches are disengaged, and rotation cannot be transmitted from the input shaft 2 to the second speed-change shaft 20 (target speed-change shaft).

Figure 17:
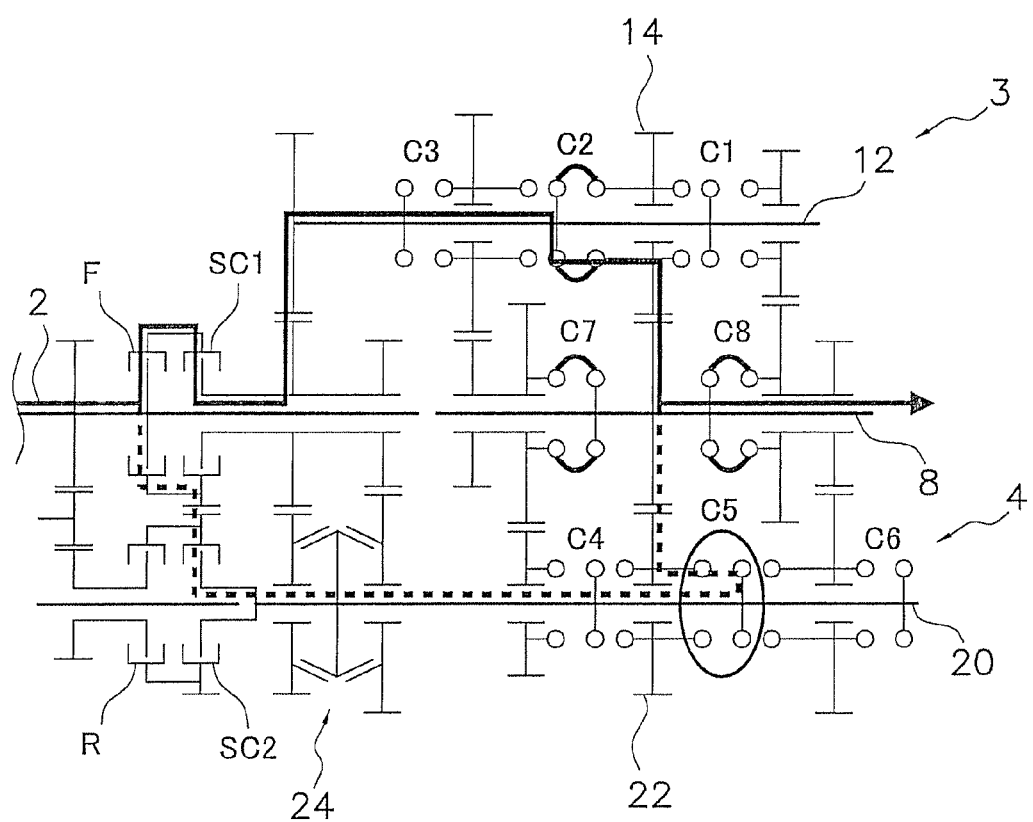
FIG. 17 is a view showing the operation of the transmission during speed changing.

The control unit 55 then moves the fifth coupling sleeve C5 that is coupling the second speed-change shaft 20 and the 6th-speed drive gear 22 to the neutral position, as shown in FIG. 17. Coupling between the second speed-change shaft 20 and the 6th-speed drive gear 22 is thereby released, and a non-coupled state occurs.

Figure 18:
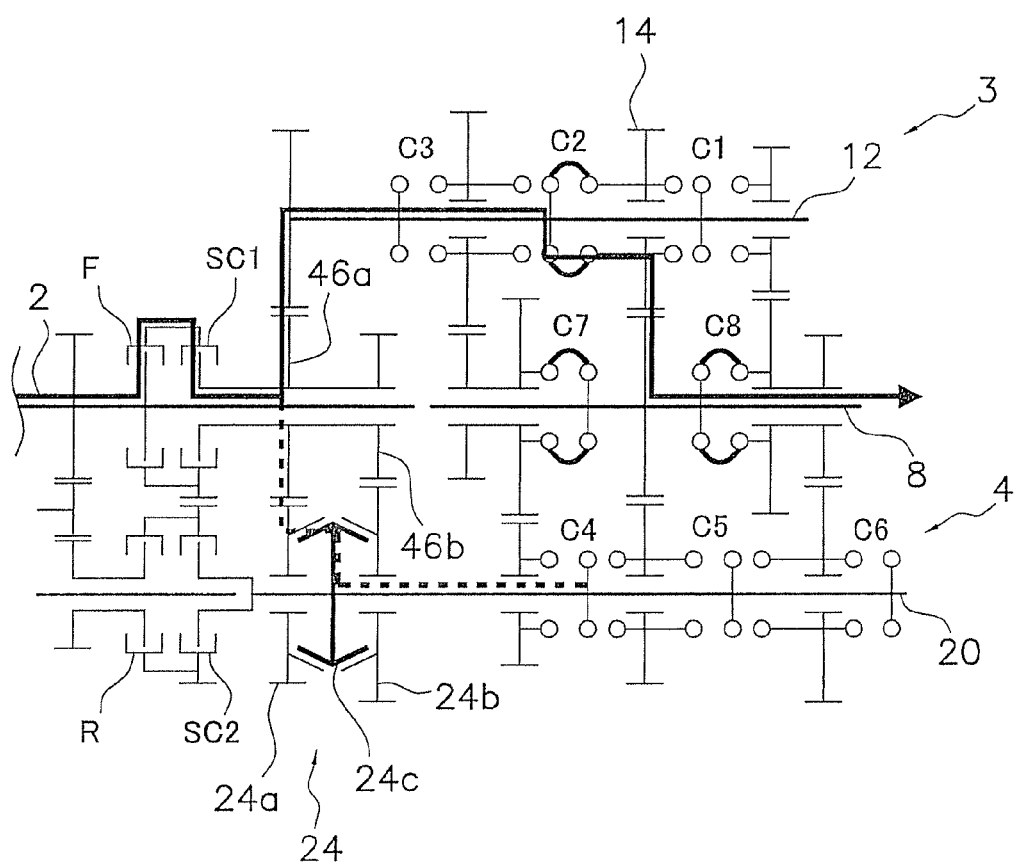
FIG. 18 is a view showing the operation of the transmission during speed changing.

The control unit 55 then controls the synchro mechanism 24 to effect synchronization. The control unit 55 in this instance moves the cone clutch 24c of the synchro mechanism 24 to the input side and momentarily couples the second speed-change shaft 20 with the first synchro gear 24a, as shown in FIG. 18. At this time, since the first synchro gear 24a is meshed with the first intermediate gear 46a, rotation on the side of the first transmission mechanism 3 is transmitted to the second speed-change shaft 20 via the first intermediate gear 46a and the first synchro gear 24a. The speed-change steps herein are set so that the interval between steps is constant, and the number of teeth of each gear is set so that the interval between steps is equal to the ratio of the number of teeth between the first intermediate gear 46a and the first synchro gear 24a, or the ratio of the number of teeth between the second intermediate gear 46b and the second synchro gear 24b. Consequently, in the state in which the fifth speed is selected, the fifth coupling sleeve C5 is deactivated, and the synchro mechanism 24 is momentarily actuated, and the speed of the second speed-change shaft 20 is thereby made the same as or close to the speed thereof when the fourth speed is selected.

Figure 19:
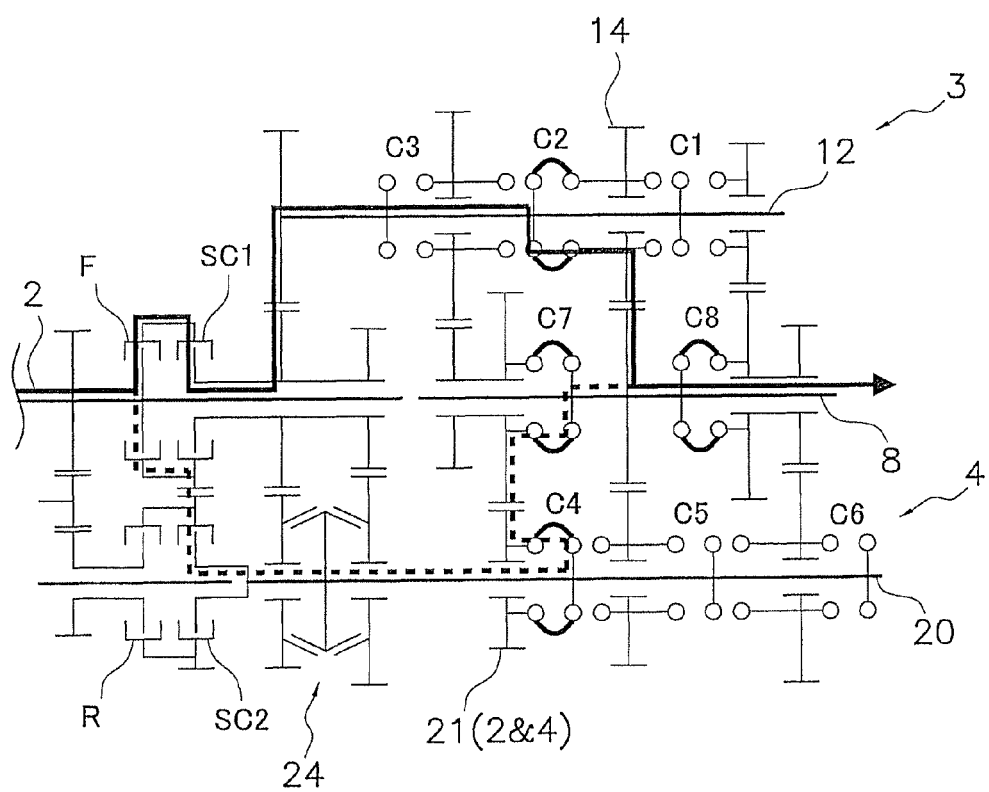
FIG. 19 is a view showing the operation of the transmission during speed changing.

After a synchronization such as described above, the control unit 55 moves the fourth coupling sleeve C4 and performs pre-shifting for coupling the second speed-change shaft 20 (target speed-change shaft) and the 2nd and 4th-speed drive gear 21 (target speed-change step gear), as shown in FIG. 19 (the synchro mechanism 24 is already disengaged). At this time, since the speed of the second speed-change shaft 20 has been controlled by the synchronization by the synchro mechanism 24 such as described above, the fourth coupling sleeve C4 can be smoothly meshed.

Figure 20:
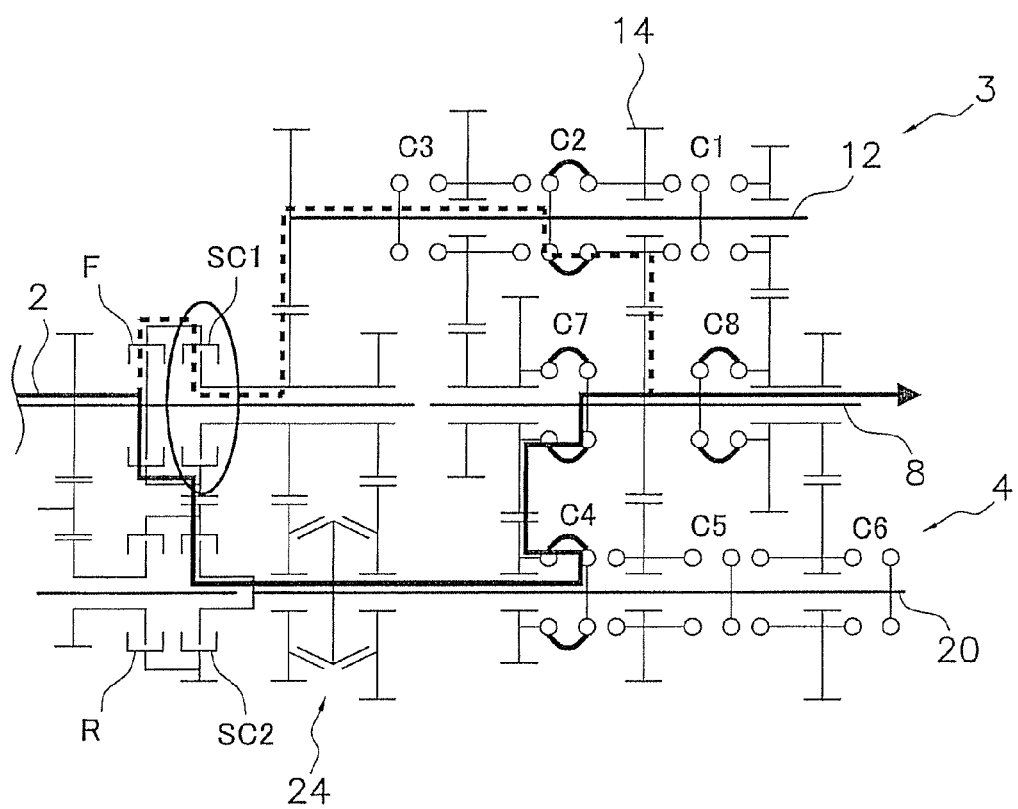
FIG. 20 is a view showing the operation of the transmission during speed changing.

The control unit 55 then disengages the first snap clutch SC1 and engages the second snap clutch SC2, as shown in FIG. 20. Transmission of rotation between the input shaft 2 and the first speed-change shaft 12 is thereby disabled, transmission of rotation between the second speed-change shaft 20 and the input shaft 2 is enabled, and power is transmitted by the path indicated by the solid line in FIG. 20. Switching of the speed step from the fifth speed to the fourth speed is thus completed.

Synchronization is performed and a smooth speed change is enabled by basically the same operation as described above during changing between other speeds.

Pre-Shift Auxiliary Control

Figure 21:
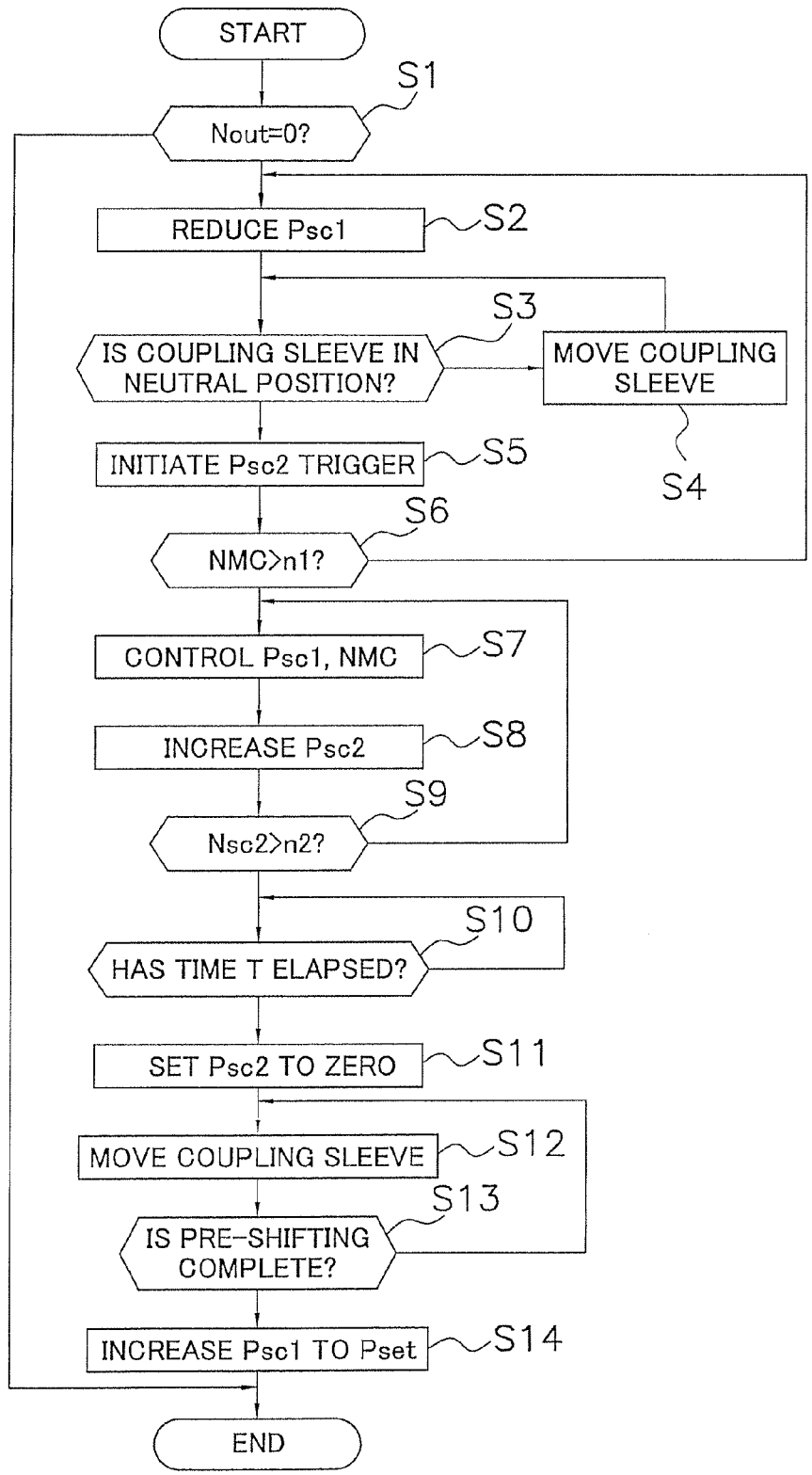
FIG. 21 is a flowchart showing pre-shifting and pre-shift auxiliary control.
Figure 22:
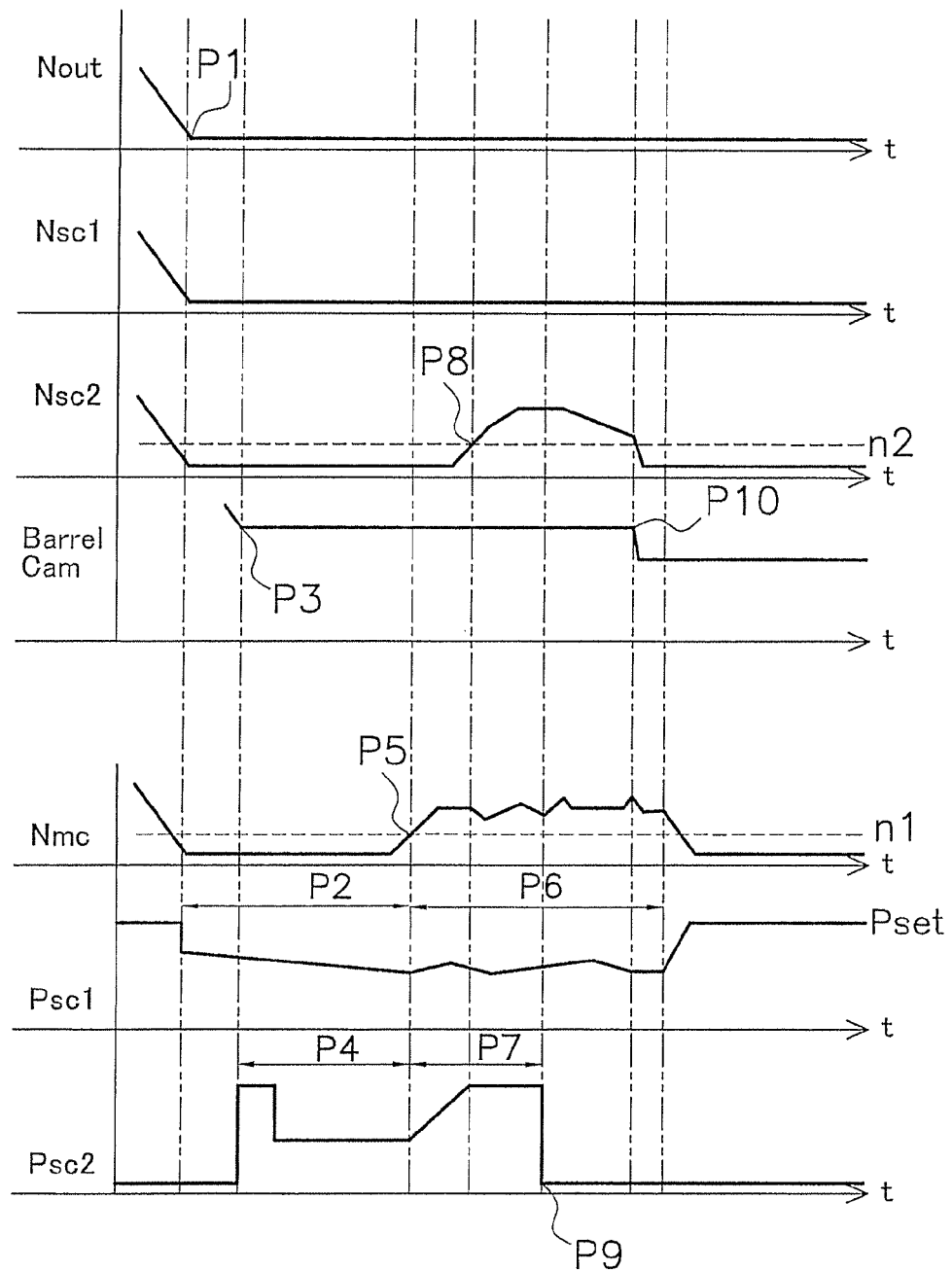
FIG. 22 is a timing chart showing pre-shifting and pre-shift auxiliary control.
Figure 23:
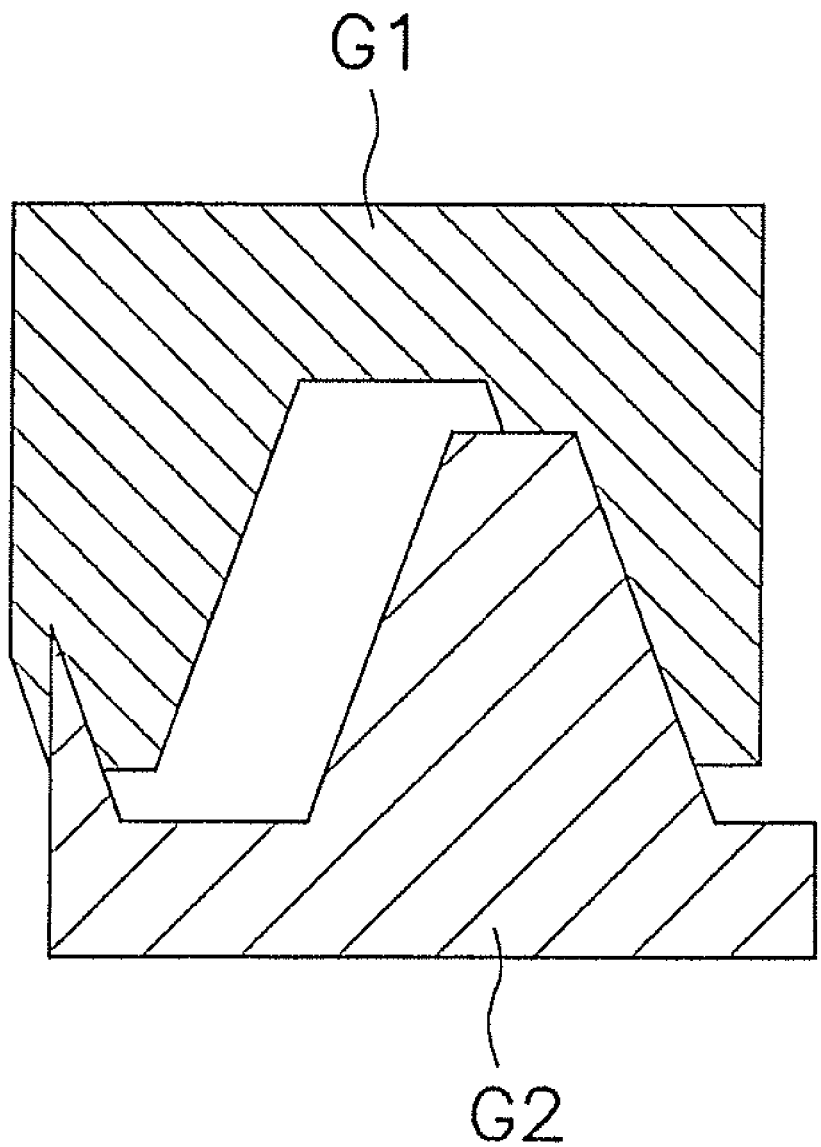
FIG. 23 is a view showing a portion of the teeth of the gear of the coupling mechanism and the coupling gear of the speed-change gears as viewed from the axial direction

In the construction vehicle 100, when the vehicle speed is zero, the pre-shifting described above is performed after pre-shift auxiliary control is performed for inputting the rotation of the input shaft 2 to the target speed-change shaft in a state in which there is no coupling between the target speed-change shaft and the plurality of drive gears. This pre-shift auxiliary control will be described based on the flowchart shown in FIG. 21 and the timing chart shown in FIG. 22. A case will be described in which a speed-change step belonging to the first group of speed-change steps, i.e., an odd-numbered speed-change step, is selected as the current speed-change step, and a speed-change step belonging to the second group of speed-change steps, i.e., an even-numbered speed-change step, is the target speed-change step. In FIG. 22, "Nout" is the speed of the output shaft 7 detected by the output shaft speed sensor SN4, "Nsc1" is the speed of the first speed-change shaft 12 detected by the first output speed sensor SN2, "Nsc2" is the speed of the second speed-change shaft 20 detected by the second output speed sensor SN3, and "Nmc" is the output speed from the main clutch MC detected by the input shaft speed sensor SN1. Also, "Psc1" is a command value of oil pressure to be fed to the first snap clutch SC1, and "Psc2" is a command value of oil pressure to be fed to the second snap clutch SC2. The label "Barrel cam" is the phase of the fourth through sixth coupling sleeves C4, C5, C6 detected by the sleeve state sensor SN5, and indicates the state of coupling between the coupling sleeves C4, C5, C6 and the drive gears 21 through 23.

First, in the first step S1, a determination is made as to whether Nout is zero. The process proceeds to the second step S2 if Nout is zero (see P1 of FIG. 22). When Nout is not zero, normal pre-shifting is performed without pre-shift auxiliary control. A case in which Nout is zero is a case such one in which the construction vehicle 100 has run into dirt or another obstacle and is unable to move, or in which the brake has been abruptly applied during travel, and due to a large load being placed on the output shaft 7, the output shaft 7 is not rotating even though the engine 51 is driven and the main clutch MC and first snap clutch SC1 are engaged, the first speed-change shaft 12 is coupled with any of the drive gears 13 through 15, and rotation from the engine 51 can be transmitted to the output shaft 7. A determination may also be made to proceed to the second step S2 when an extremely low speed that indicates a state such as described above is occurring, and not only when Nout is strictly zero.

In the second step S2, the control unit 55 sends a command to the first clutch control valve CV1 to gradually reduce Psc1 (see P2 of FIG. 22). The oil pressure fed to the first snap clutch SC1 is thereby gradually reduced, and the transmission torque capacity of the first snap clutch SC1 is reduced. When the transmission torque capacity of the first snap clutch SC1 decreases, the load applied to the input shaft 2 from the output shaft 7 via the first speed-change shaft 12 is reduced.

Then, in the third step S3, a determination is made as to whether the coupling sleeve that corresponds to the second speed-change shaft 20, i.e., the fourth through sixth coupling sleeves C4, C5, C6, are in the neutral position, on the basis of the detection signal from the sleeve state sensor SN5. When the fourth through sixth coupling sleeves C4, C5, C6 are not in the neutral position, the control unit 55 sends a command to the second shift actuator SA2 so that the fourth through sixth coupling sleeves C4, C5, C6 move to the neutral position in the fourth step S4. The fourth through sixth coupling sleeves C4, C5, C6 thereby move to the neutral position. When the fourth through sixth coupling sleeves C4, C5, C6 are in the neutral position (see P3 of FIG. 22), the process proceeds to the fifth step S5.

In the fifth step S5, the control unit 55 momentarily transmits a signal for increasing Psc2 to the second clutch control valve CV2, and then transmits a signal for maintaining a smaller pressure than the peak (see P4 of FIG. 22). This control is a trigger for subsequently increasing Psc2.

Then, in the sixth step S6, a determination is made as to whether Nmc is larger than a predetermined threshold value n1. A determination is thus made as to whether the input shaft 2 has started to rotate as a result of the load applied to the input shaft 2 from the output shaft 7 via the first speed-change shaft 12 having been reduced in the second step S2. When Nmc is not larger than the threshold value n1, the process returns to the second step S2. When Nmc is larger than the threshold value n1 (see P5 of FIG. 22), the process proceeds to the seventh step S7.

In the seventh step S7, the control unit 55 controls Nmc by controlling Psc1 (see P6 of FIG. 22). In this instance, Psc1 is controlled so that Nmc is maintained at a predetermined speed that is greater than the threshold value n1.

In the eighth step S8, the control unit 55 transmits a signal to the second clutch control valve CV2 to increase Psc2 to a predetermined pressure (see P7 of FIG. 22). The oil pressure fed to the second snap clutch SC2 thereby increases, and the transmission torque capacity of the second snap clutch SC2 increases.

A determination is then made in the ninth step S9 as to whether Nsc2 is greater than a predetermined threshold value n2. As a result of the transmission torque capacity of the second snap clutch SC2 having increased in the eighth step S8, a portion of the drive power of the input shaft 2 is transmitted to the second speed-change shaft 20, and a determination is made as to whether the second speed-change shaft 20 has started to rotate. When Nsc2 is not larger than the threshold value n2, the process returns to the seventh step S7. The process proceeds to the tenth step S10 if Nsc2 is larger than the threshold value n2 (see P8 of FIG. 22).

In the tenth step S10, a determination is made as to whether a predetermined time T has elapsed since Nsc2 became larger than the threshold value n2. When the predetermined time T has elapsed, the process proceeds to the eleventh step S11.

In the eleventh step S11, a signal for reducing Psc2 to zero is transmitted to the second clutch control valve CV2 (see P9 of FIG. 22). The second snap clutch SC2 is thereby deactivated, and transmission of rotation from the input shaft 2 to the second speed-change shaft 20 is disabled.

Then, in the twelfth step S12, the control unit 55 transmits a signal to the second shift actuator SA2 so that the coupling sleeve moves that corresponds to the speed-change step that is the target of pre-shifting among the fourth through sixth coupling sleeves C4, C5, C6. The coupling sleeve thereby moves, and the second speed-change shaft 20 and the drive gear that corresponds to the target speed-change step are coupled.

In the thirteenth step S13, a determination is made as to whether pre-shifting is completed, on the basis of the detection signal from the sleeve state sensor SN5. When pre-shifting is complete (see P10 of FIG. 22), the process proceeds to the fourteenth step S14.

In the fourteenth step S14, a signal for increasing Psc1 to a set pressure Pset of a time prior to the start of pre-shift auxiliary control is transmitted to the first clutch control valve CV1. The first snap clutch SC1 is thereby placed in a fully engaged state, and the rotation from the input shaft 2 is completely transmitted to the first speed-change shaft 12.

After pre-shift auxiliary control and pre-shifting as described above are completed, the control unit 55 disengages the first snap clutch SC1 and engages the second snap clutch SC2. Switching from the current speed-change step that belongs to the first group of speed-change steps to the target speed-change step that belongs to the second group of speed-change steps is thereby completed.

When a switch is made from a current speed-change step that belongs to the second group of speed-change steps to a target speed-change step that belongs to the first group of speed-change steps, a snap clutch and a coupling sleeve that correspond to the opposite group of speed-change steps from that described above are controlled.

Effects of the Present Embodiment

In this construction vehicle 100, it is possible to prevent the coupling sleeve and the drive gears from being impossible to couple during pre-shifting, even when the construction vehicle 100 is stopped and the speed of the output shaft is zero. The speed-change step can thereby be switched even when the construction vehicle 100 is stopped. The time lag that occurs when restarting travel from a low speed step can also be reduced.

Other Embodiments (a) In the embodiment described above, an example was described of a transmission having ten speed-change steps of forward and reverse travel, but the number of speed-change steps is not limited by the embodiment.

(b) The arrangement or structure of the forward clutch F, the first snap clutch SC1, the reverse clutch R, and the second snap clutch SC2 is not limited by the embodiment described above.

(c) In the embodiment described above, pre-shift auxiliary control was performed when the speed of the output shaft 7 detected by the output shaft speed sensor SN4 was zero, but a configuration may also be adopted in which another vehicle speed sensor for detecting the vehicle speed is used, and pre-shift auxiliary control is performed when the vehicle speed detected by the vehicle speed sensor is zero.

Pre-shift auxiliary control may also be performed when the speed of the output shaft detected by the output shaft speed sensor SN4 is zero, and the output speed from the main clutch MC detected by the input shaft speed sensor SN1 is zero. Specifically, the threshold value n1 may be set equal to 0 in the flowchart of pre-shift auxiliary control shown in FIG. 21. In this case, the control unit 55 can accurately assess slipping of the main clutch by the load from the output shaft and perform pre-shift auxiliary control. In the flowchart of FIG. 21, step S6 may be executed immediately after step S1.

(d) The present invention was applied to a wheel loader in the embodiment described above, but the present invention may also be applied to other construction vehicles.

In the construction vehicle of the embodiments, pre-shifting can be performed, and the speed step can be rapidly switched even when the vehicle is stopped.

The invention claimed is:

1. A construction vehicle comprising:
an input shaft to which rotation from an engine is inputted;
a first speed-change shaft and a second speed-change shaft to which rotation from the input shaft is inputted;
an output shaft to which rotation from the first speed-change shaft and the second speed-change shaft is inputted;
a clutch mechanism configured and arranged to switch between a transmitting state and a non-transmitting state of rotation from the input shaft to the first speed-change shaft, and to switch between a transmitting state and a non-transmitting state of rotation from the input shaft to the second speed-change shaft;
a first transmission mechanism configured and arranged to shift rotational speed of the first speed-change shaft between a plurality of speeds that belongs to a first group of speeds, and to transmit the rotation to the output shaft, the first transmission mechanism having a plurality of speed-change gears that corresponds to the plurality of speeds belonging to the first group;
a second transmission mechanism configured and arranged to shift rotational speed of the second speed-change shaft between a plurality of speeds that belongs to a second group of speeds, and to transmit the rotation to the output shaft, the second transmission mechanism having a plurality of speed-change gears that corresponds to the plurality of speeds belonging to the second group;
a first coupling mechanism configured and arranged to switch between a coupling state and a non-coupling state between the first speed-change shaft and a selected one of the speed-change gears of the first transmission mechanism by selectively engaging with a clutch gear provided to the selected one of the speed-change gears of the first transmission mechanism;
a second coupling mechanism configured and arranged to switch between a coupling state and a non-coupling state between the second speed-change shaft and a selected one of the speed-change gears of the second transmission mechanism by selectively engaging with a clutch gear provided to the selected one of the speed-change gears of the second transmission mechanism;
a vehicle speed detecting section configured and arranged to detect a vehicle speed; and
a control unit configured to control the clutch mechanism, the first and second transmission mechanisms, and the first and second coupling mechanisms to shift gears from a current speed of one of the first and second groups to a target speed of the other of the first and second groups by performing a pre-shifting control to couple a target speed-change gear corresponding to the target speed with a target speed-change shaft, which is one of the first and second speed-change shafts in the non-transmitting state of rotation from the input shaft, in a state in which coupling is established between a current speed-change gear corresponding to the current speed and a current speed-change shaft, which is the other of the first and second speed-change shafts in the transmitting state of rotation from the input shaft, and then disabling transmission of rotation between the current speed-change shaft and the input shaft and enabling transmission of rotation between the target speed-change shaft and the input shaft,
the control unit being configured to perform pre-shift auxiliary control prior to the pre-shifting control to input the rotation of the input shaft to the target speed-change shaft in a state in which the target speed-change shaft is not coupled to the plurality of speed-change gears, when the vehicle speed detected by the vehicle speed detector is zero.

2. The construction vehicle according to claim 1, further comprising
a main clutch configured and arranged to switch between a transmitting state and a non-transmitting state of rotation from the engine to the input shaft,
the clutch mechanism having a first clutch configured and arranged to switch between the transmitting state and the non-transmitting state of rotation from the input shaft to the first speed-change shaft, and a second clutch configured and arranged to switch between the transmitting state and the non-transmitting state of rotation from the input shaft to the second speed-change shaft,
the control unit being further configured to reduce transmission torque capacity of one of the first and second clutches for switching between the transmitting state and the non-transmitting state of rotation from the input shaft to the current speed-change shaft when an input speed from the main clutch to the input shaft reaches zero in the pre-shift auxiliary control, and to increase transmission torque capacity of the other one of the first and second clutches for switching between the transmitting state and the non-transmitting state of rotation from the input shaft to the target speed-change shaft when the input speed from the main clutch to the input shaft increases.

* * * * *